(12) United States Patent
Singh et al.

(10) Patent No.: US 12,340,166 B2
(45) Date of Patent: Jun. 24, 2025

(54) DOCUMENT DECOMPOSITION BASED ON DETERMINED LOGICAL VISUAL LAYERING OF DOCUMENT CONTENT

(71) Applicant: Adobe Inc., San Jose, CA (US)

(72) Inventors: Punit Singh, New Delhi (IN); Jayant Vaibhav Srivastava, Noida (IN); Ankit Bal, Noida (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 18/328,593

(22) Filed: Jun. 2, 2023

(65) Prior Publication Data

US 2024/0403543 A1 Dec. 5, 2024

(51) Int. Cl.
G06F 3/048 (2013.01)
G06F 40/169 (2020.01)
G06F 40/197 (2020.01)

(52) U.S. Cl.
CPC .......... G06F 40/169 (2020.01); G06F 40/197 (2020.01)

(58) Field of Classification Search
CPC .................................................. G06F 40/169
See application file for complete search history.

(56) References Cited

U.S. PATENT DOCUMENTS

| | | | | |
|---|---|---|---|---|
| 7,386,789 B2* | 6/2008 | Chao | ...................... | G06F 40/166 715/239 |
| 9,922,007 B1* | 3/2018 | Jain | ........................ | H04L 67/56 |
| 11,514,282 B1* | 11/2022 | Moore | ............... | G06K 15/1836 |
| 11,798,246 B2* | 10/2023 | Lee | .......................... | G06T 13/40 |
| 2005/0180642 A1* | 8/2005 | Curry | ................... | G06V 30/413 382/302 |
| 2008/0194325 A1* | 8/2008 | Komuta | .................. | A63F 13/45 463/31 |
| 2015/0082148 A1* | 3/2015 | Lai | ......................... | G06F 40/151 715/235 |
| 2015/0199314 A1* | 7/2015 | Ratnakar | ............... | G06F 40/143 715/255 |
| 2016/0124813 A1* | 5/2016 | Jain | ......................... | G06F 16/93 707/684 |
| 2016/0232204 A1* | 8/2016 | Zholudev | .............. | G06F 40/117 |
| 2017/0124717 A1* | 5/2017 | Baruch | ................... | G06T 7/136 |
| 2017/0212870 A1* | 7/2017 | Thomsen | ............... | G06F 40/106 |
| 2020/0175095 A1* | 6/2020 | Morariu | ................. | G06N 3/045 |
| 2021/0319166 A1* | 10/2021 | Lyu | .......................... | G06F 21/53 |
| 2021/0334664 A1* | 10/2021 | Li | ........................... | G06V 10/25 |
| 2022/0262009 A1* | 8/2022 | Yu | ........................... | G06T 7/194 |

(Continued)

OTHER PUBLICATIONS

Park et al., A Smart Communication System for Avatar Agents in Virtual Environment, 2008, IEEE, 7 pages. (Year: 2008).*

*Primary Examiner* — Linh K Pham
(74) *Attorney, Agent, or Firm* — Nicholson De Vos Webster & Elliott LLP

(57) ABSTRACT

Techniques for document decomposition based on determined logical visual layering of document content. The techniques include iteratively identifying a plurality of logical visual layers of a document resulting in each logical visual layer being associated with one or more document content objects of the document. The one or more document content objects associated with each logical visual layer are annotated to be indicative of the associated logical visual layer. The document is then displayed with an indication of one or more of the annotated document objects.

20 Claims, 16 Drawing Sheets

(56) References Cited

U.S. PATENT DOCUMENTS

| | | | |
|---|---|---|---|
| 2022/0314121 A1* | 10/2022 | Fukutsuka | A63F 13/573 |
| 2023/0206955 A1* | 6/2023 | Cole | G11B 27/005 |
| | | | 386/280 |
| 2024/0144141 A1* | 5/2024 | Cella | G06Q 30/0206 |
| 2025/0036254 A1* | 1/2025 | Wang | G06F 3/04815 |

* cited by examiner

FIRST ITERATION

FIRST ITERATION

FOREGROUND IMAGE
600

602-1 ACTIVITY:

602-3 LESSON:   602-2 SUBJECT:

602-4 NOTE:

602-5

SECOND ITERATION

DOCUMENT DECOMPOSITION BASED ON DETERMINED LOGICAL VISUAL LAYERING OF DOCUMENT CONTENT

BACKGROUND

The accuracy of document decomposition with respect to document content can affect how useful the decomposition is. Consider an example where a user wishes to edit text, image, or graphics content in a document, where the content is visually layered, with some of the content visually overlapping other content. This is common with documents used in graphics design or other creative fields where multiple content objects are combined into an overall document composition. A user may want to edit a particular content object of the document that is visually layered behind another content object of the document. The accuracy in detecting the underlying content object can be critically important. For example, if a document decomposition technique does not detect the underlying content object, or detects only part of it, the user may not be able to edit the document as desired.

Techniques described herein address these issues.

SUMMARY

Methods, systems, and non-transitory computer-readable media (collectively referred to as "techniques") are provided for document decomposition based on determined logical visual layering of document content. The techniques include iteratively decomposing a document into its constituent content objects based on a determined logical visual layering of the content objects in the document. At each iteration of the document decomposition, content objects in the visual foreground are determined. Those foreground objects are removed from the document, and another iteration is performed using the document with the foreground objects determined in the prior iteration removed. Iterations continue as long as content objects continue to be detected in the foreground. All content objects determined to be in the foreground across all iterations are then combined in a final result.

In some embodiments, the techniques proceed by iteratively decomposing a visually layered document into its constituent content objects. For example, the document may be composed of multiple logical visual layers where each layer can include text, raster images, and vector graphics. Furthermore, content in one logical visual layer can visually overlap content in another logical visual layer. At each iteration, content objects in the current logical visual layer are determined. Those content objects are removed from the document before the next iteration, forming a new current logical visual layer where the content objects in the layer are no longer visually overlapped by any content objects in the prior current logical layer that were removed from the document in the prior iteration. Iterations continue until there are no longer any content objects detected in the current logical visual layer. The content object determinations across all logical visual layers and all iterations are then combined into a final result. By doing so, the techniques can detect underlying content objects with greater accuracy compared to existing approaches.

Additional features and advantages of the techniques are set forth in the description which follows, and in part will be apparent from the description, or may be learned by the practice of the techniques.

BRIEF DESCRIPTION OF THE DRAWINGS

The detailed description is described with reference to the accompanying drawings in which.

DETAILED DESCRIPTION

Figure 1:
FIG. 1 depicts an example of a visually layered document.

Techniques are disclosed for decomposing a visually layered document into its constituent content objects (e.g., text objects, raster image objects, and vector graphics objects). The techniques include iteratively decomposing a document into its constituent content objects based on a determined logical visual layering of the content objects in the document.

Existing techniques for document decomposition do not perform sufficiently well with documents having layers of visually overlapping content, which is common in documents for presentations, posters, advertisement flyers, and the like. The deficiencies of existing techniques with these kinds of documents result from using a one-shot approach in which the document is decomposed into content objects in a single pass over the document.

In contrast, the techniques disclosed herein iteratively decompose the document into logical visual layers based on the determined logical visual layering of the document content and then combine the content object determinations of each logical visual layer. By doing so, the techniques can detect content objects overlapped by other content objects that existing techniques do not detect.

The accuracy of a document decomposition technique in detecting content objects in a document can be vitally important to the success of the technique. Unfortunately, content objects are often not expressly labeled as such in many types of documents. Instead, the documents are collections of text, raster images, and vector graphics content along with instructions or data for rendering the content. So, inference detecting content objects is needed. Along with the need for inference, there is a need for accuracy.

Techniques disclosed herein meet the need for inference and the need for accuracy, using an iterative document decomposition approach. At each iteration of the document decomposition, content objects in the visual foreground are determined. Those foreground objects are removed from the document and another iteration is performed using the document with the foreground objects determined in the prior iteration removed. Iterations continue so long as content objects continue to be detected in the foreground. All content objects determined to be in the foreground across all iterations are then combined.

Techniques disclosed herein address issues with the existing approaches for document decomposition. As an example of the problem addressed by the techniques disclosed herein, consider example visually layered document 100 of FIG. 1. Example visually layered document 100 is composed of various different types of content including text and raster images. Some content visually overlaps other content. For example, the text "/THE COOKIE JAR" visually overlaps a raster image of a cookie in the upper-left hand corner of the document. A user may wish to edit the raster image of a cookie such as, for example, to change the color or other visual properties of the image or to reposition the image on the page.

Machine learning-based object detection and image segmentation approaches exist for detecting content within an image of a document. It can be difficult for these approaches to properly detect underlying content that is visually overlapped by other content. These existing approaches attempt to identify all content in one-shot and do not iteratively decompose the document into logical visual layers. Consequently, underlying content may not be detected or may not be detected in its entirety.

Figure 2:
FIG. 2 depicts the example visually layered document of FIG. 1 with bounding boxes showing content detected by an existing approach for document decomposition.

For example, FIG. 2 depicts how an existing machine learning-based object detection approach detects content in example visually layered document 100 of FIG. 1. Example visually layered document 200 of FIG. 2 corresponds to example visually layered document 100 of FIG. 1 but with dashed bounding boxes surrounding the content detected by the existing approach. The existing approach detected content 202-1, 202-2, 202-3, 202-4, 202-5, 202-6, 202-7, and 202-8. Content 202-1, 202-5, and 202-8 correspond to raster images of example visually layered document 200. Content 202-2, 202-3, 202-4, 2026, and 202-7 corresponds to text of example visually layered document 200. Note, however, that the existing approach failed to detect the entire cookie displayed in the upper-left hand corner of example visually layered document 200. Instead, the existing approach detected only the upper portion of the presented cookie above content 202-2. The existing approach was unable to determine that text content 202-2 overlays the raster image of the cookie and thus identified only a portion of the presented cookie image as content 202-1.

In contrast to the existing approach, the techniques disclosed herein proceed by iteratively decomposing a visually layered document into its constituent content objects. For example, the document may be composed of multiple logical visual layers where each logical visual layer can include text, raster images, and vector graphics. Further, content in one logical visual layer can visually overlap content in another logical visual layer. At each iteration, content objects in the current logical visual layer are determined. Those content objects are removed from the document before the next iteration forming a new current logical visual layer where the content objects in the new current logical visual layer are no longer visually overlapped by any content objects in the prior current logical visual layer that were removed from the document in the prior iteration. Iterations continue until there are no longer content objects detected in the current logical visual layer. The content objects determinations across all logical visual layers and all iterations are then combined into a final result. By doing so, the techniques can detect underlying content objects with greater accuracy compared to existing approaches.

The techniques may rely on machine learning to infer the logical visual layers of a document and to detect or segment content objects within each logical visual layer.

Figure 3:
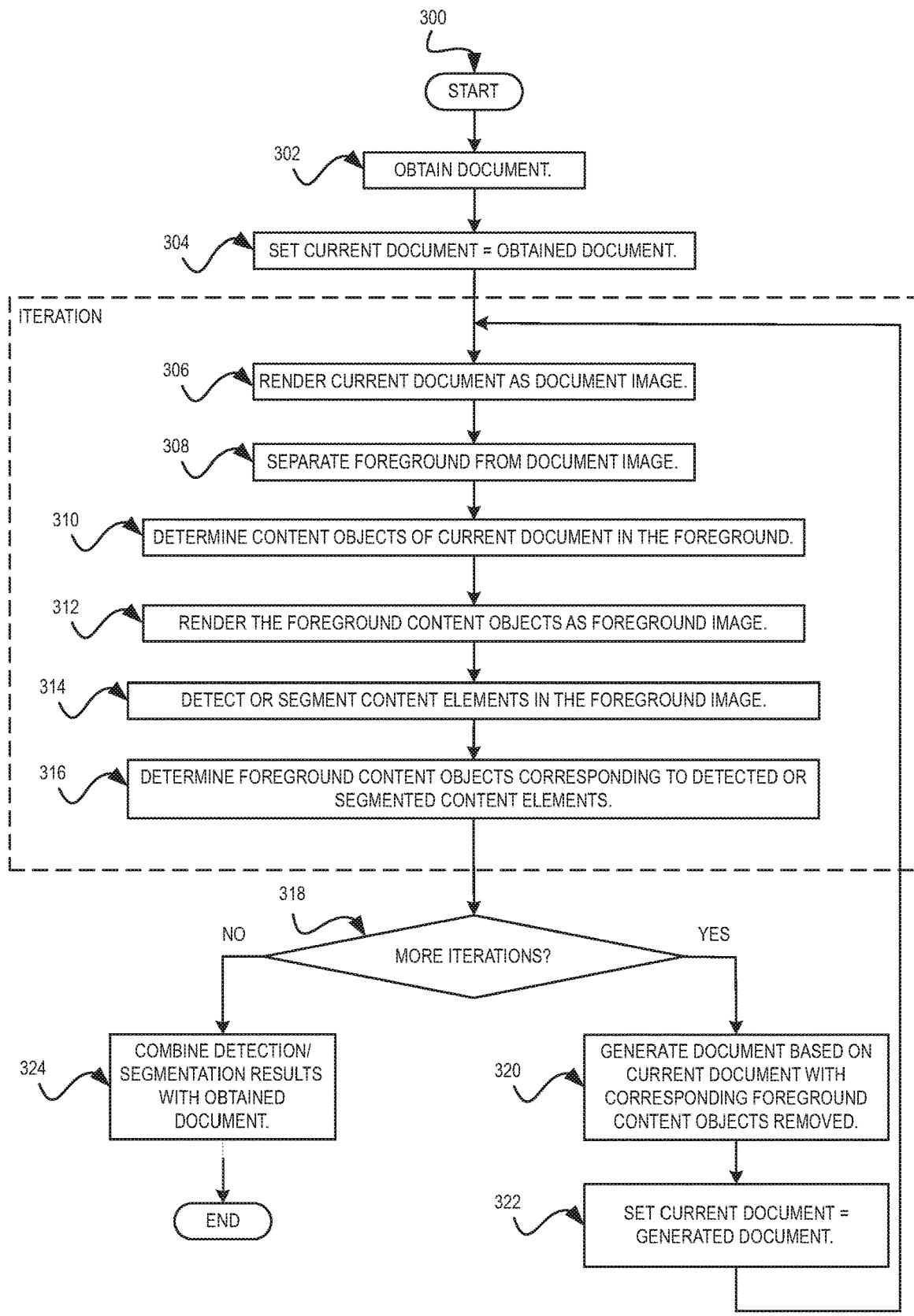
FIG. 3 is a flowchart of an iterative process for document decomposition based on determined logical visual layering of document content, according to some embodiments.

Example Process for Document Decomposition Based on Determined Logical Visual Layering of Document Content FIG. 3 illustrates iterative process 300 for document decomposition based on determined logical visual layering of document content, according to some embodiments. In summary, iterative process 300 proceeds by obtaining 302 a document to be decomposed into its constituent content objects. The obtained document is set 304 as the current document for an iterative decomposition process. Iterative process 300 encompasses one or more document decomposition iterations.

At each iteration, the current document is rendered 306 as a "document" image. In the current iteration, the foreground of the document image is separated 308 from the document image. The content objects of the current document that are in the foreground are determined 310. The content objects of the current document determined to be in the foreground are rendered 312 as a "foreground" image. Object detection or image segmentation is applied to the foreground image to detect or segment 314 content elements in the foreground image. Determined 310 foreground content objects that correspond to detected or segmented 314 content elements are determined 316.

At the end of each iteration, iterative process 300 makes a decision 118 if more iterations are to be performed. If so, before proceeding with the next iteration, a new document is generated 320 in the current iteration based on removing from the current document the content objects determined 310 to be the foreground. The current document is then set 322 to the new document for the next iteration. On the other hand, if no further iterations are to be performed, then all corresponding content objects determined 316 across all iterations are combined 324 in a final result.

Figure 4:
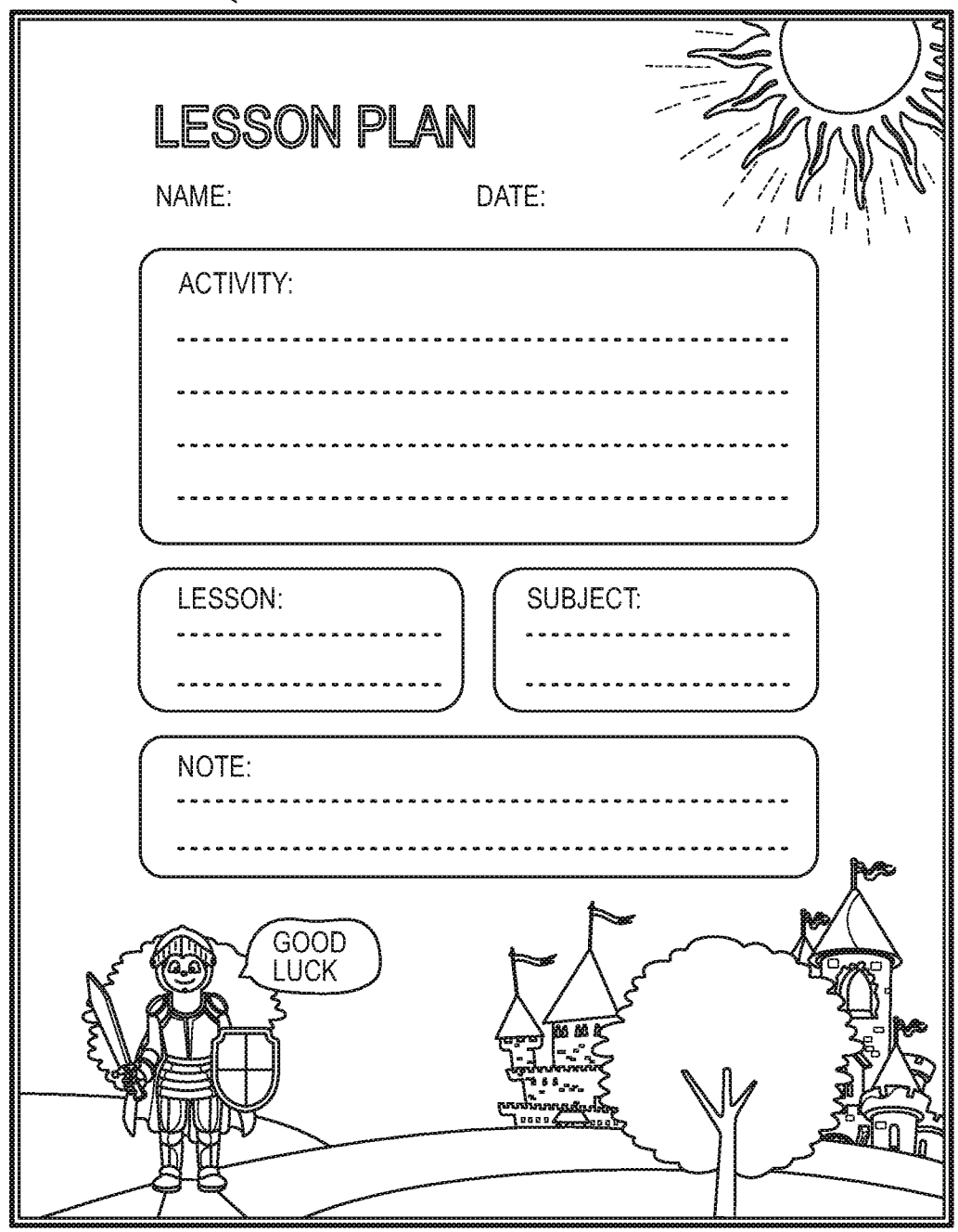
FIG. 4 depicts an example document image of a first iteration of the iterative document decomposition process, according to some embodiments.
Figure 5:
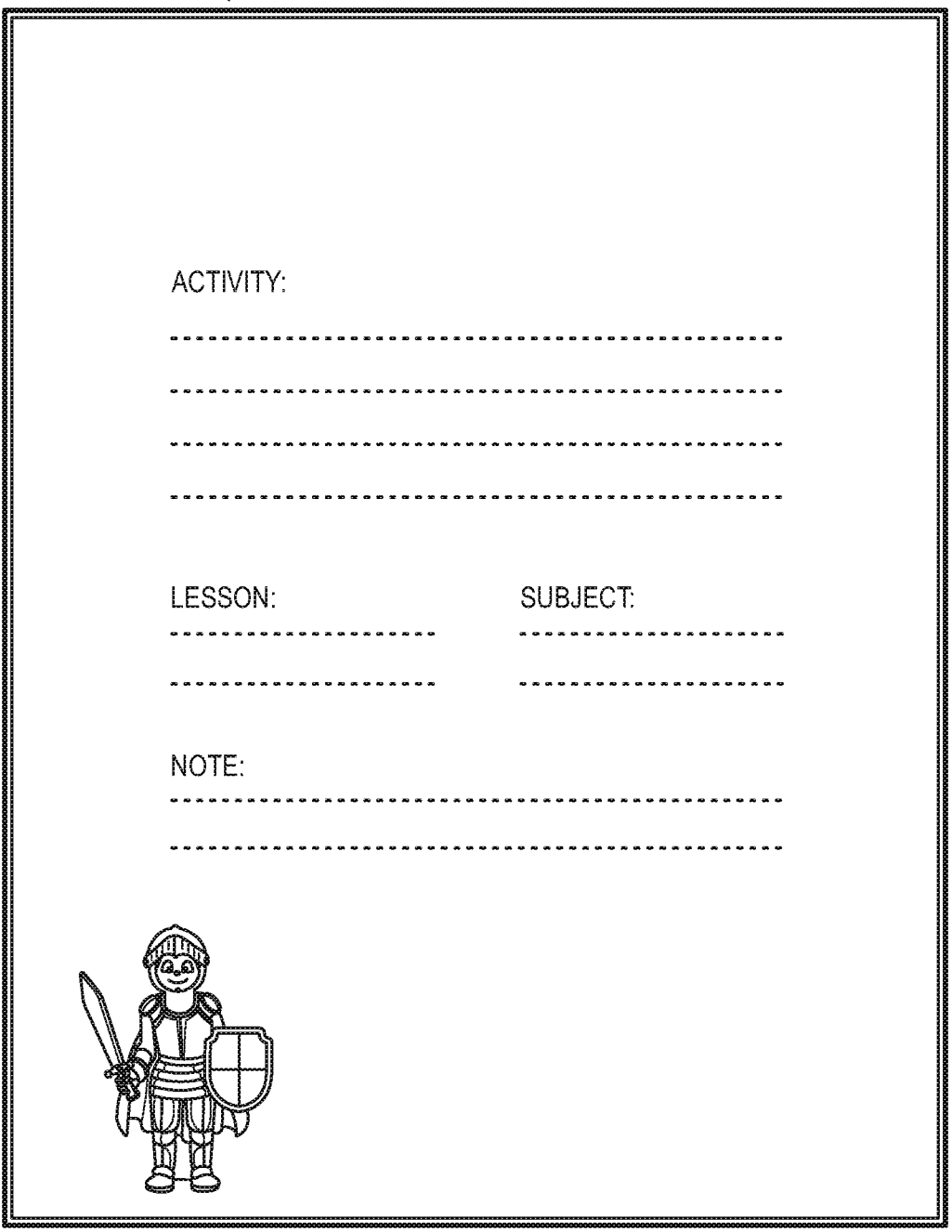
FIG. 5 depicts an example foreground image of the first iteration of the iterative document decomposition process, according to some embodiments.
Figure 6:
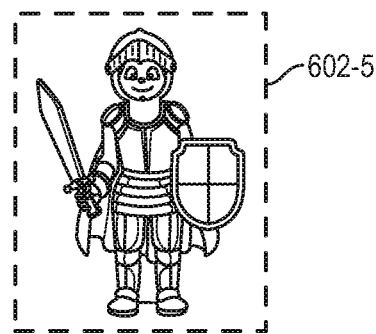
FIG. 6 depicts detection of content elements in the example foreground image of the first iteration of the iterative document decomposition process, according to some embodiments.
Figure 7:
FIG. 7 depicts an example document image of a second iteration of the iterative document decomposition process, according to some embodiments.
Figure 8:
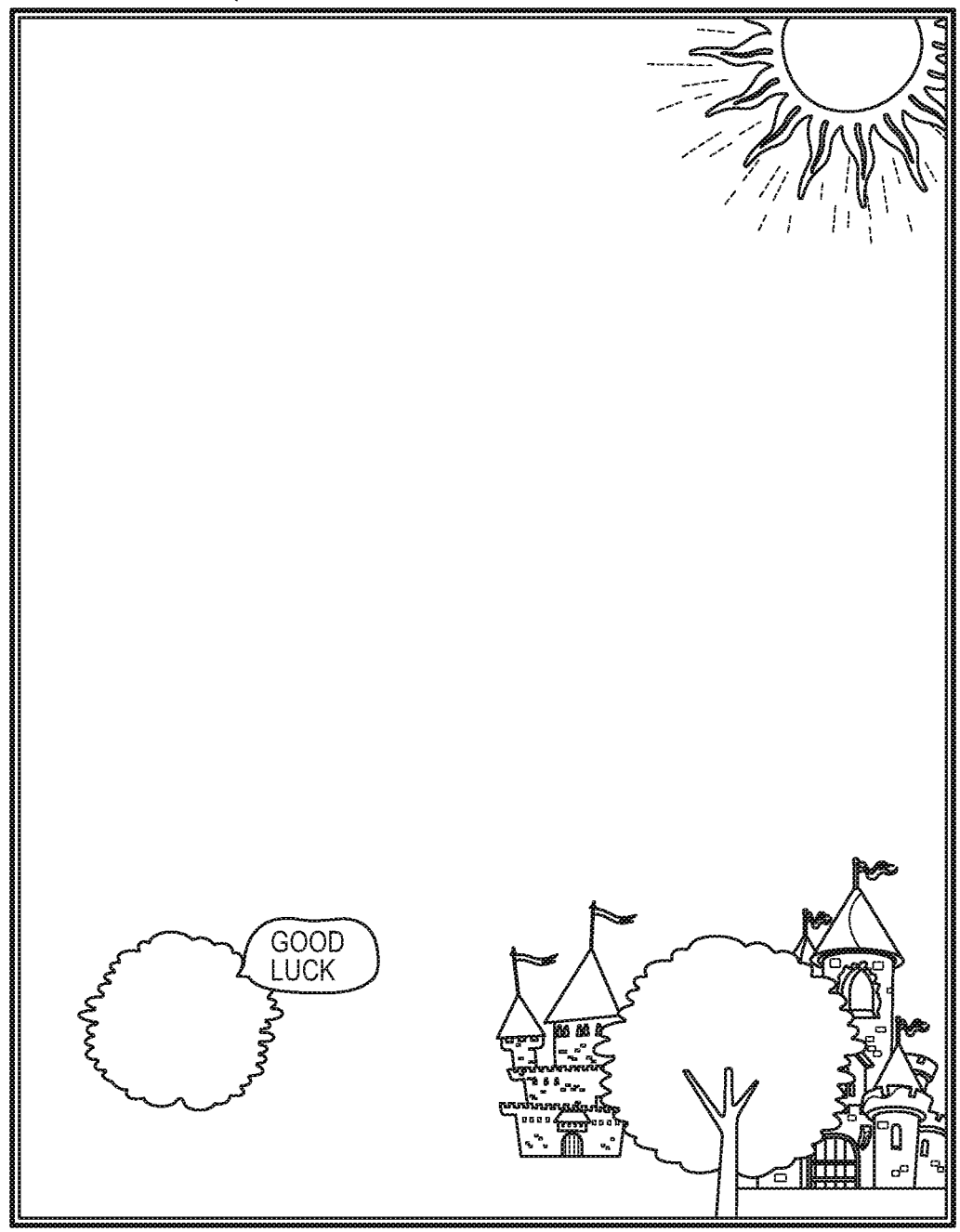
FIG. 8 depicts an example foreground image of the second iteration of the iterative document decomposition process, according to some embodiments.
Figure 9:
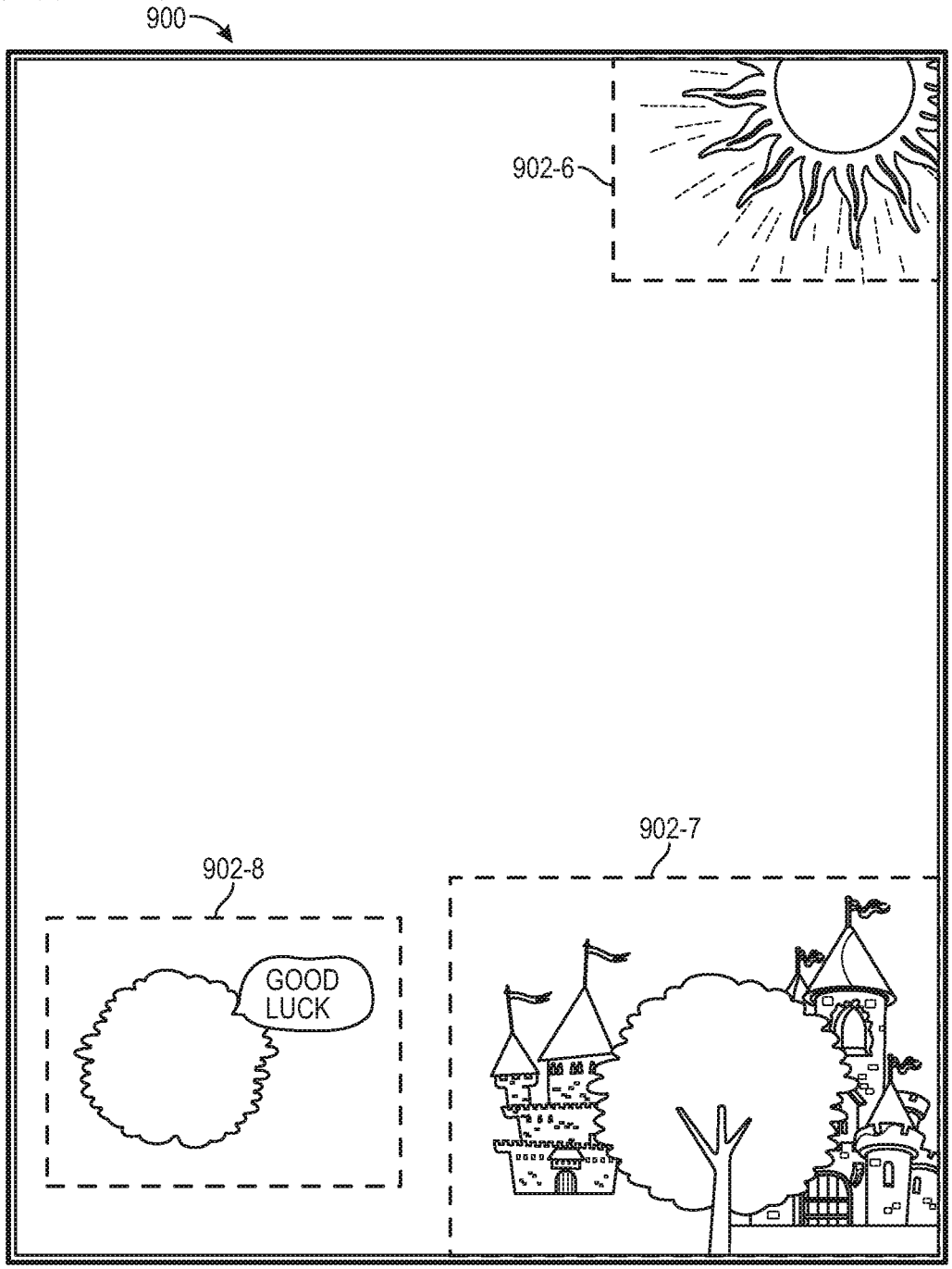
FIG. 9 depicts detection of content elements in the example foreground image of the second iteration of the iterative document decomposition process, according to some embodiments.
Figure 10:
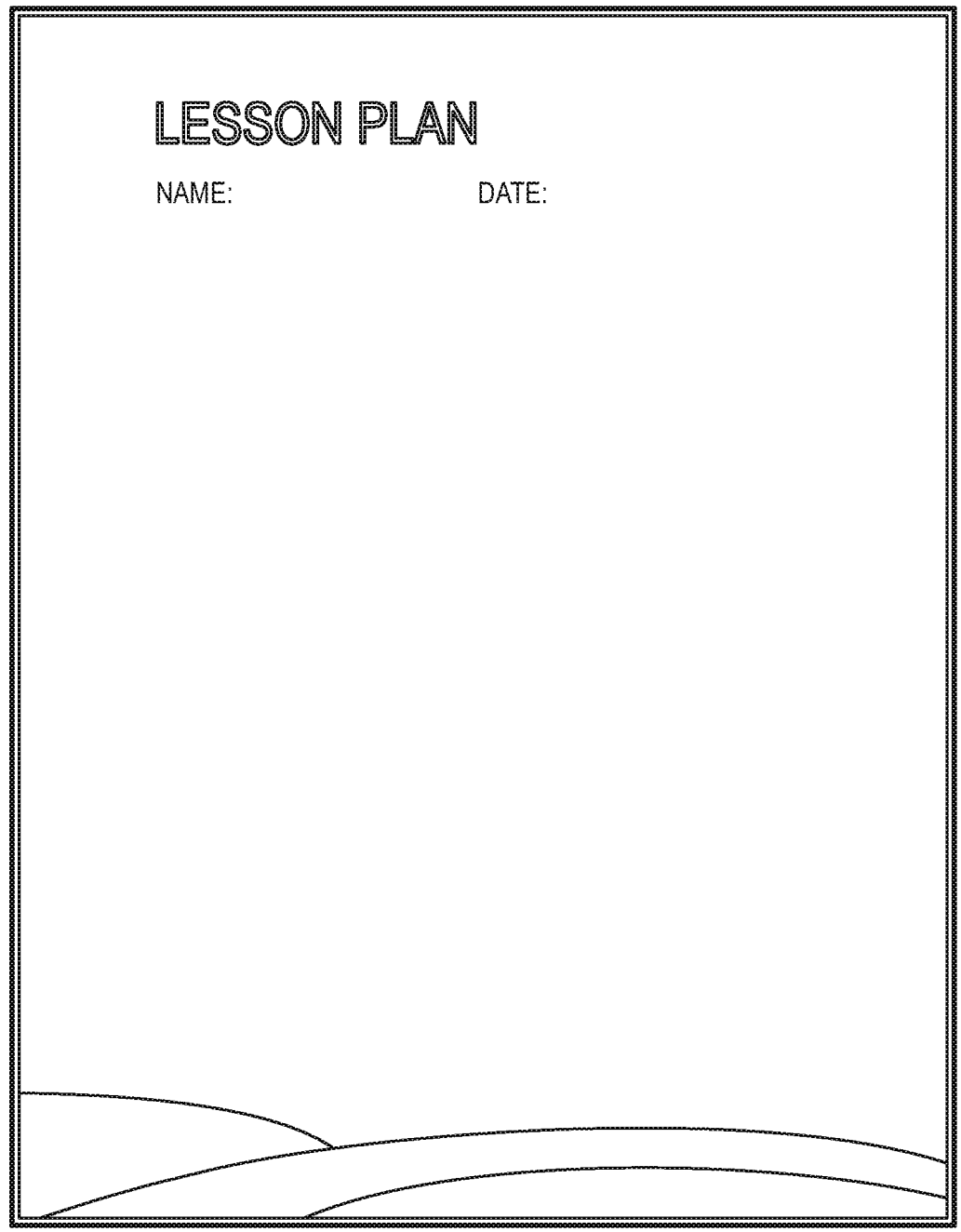
FIG. 10 depicts an example document image of a third iteration of the iterative document decomposition process, according to some embodiments.
Figure 11:
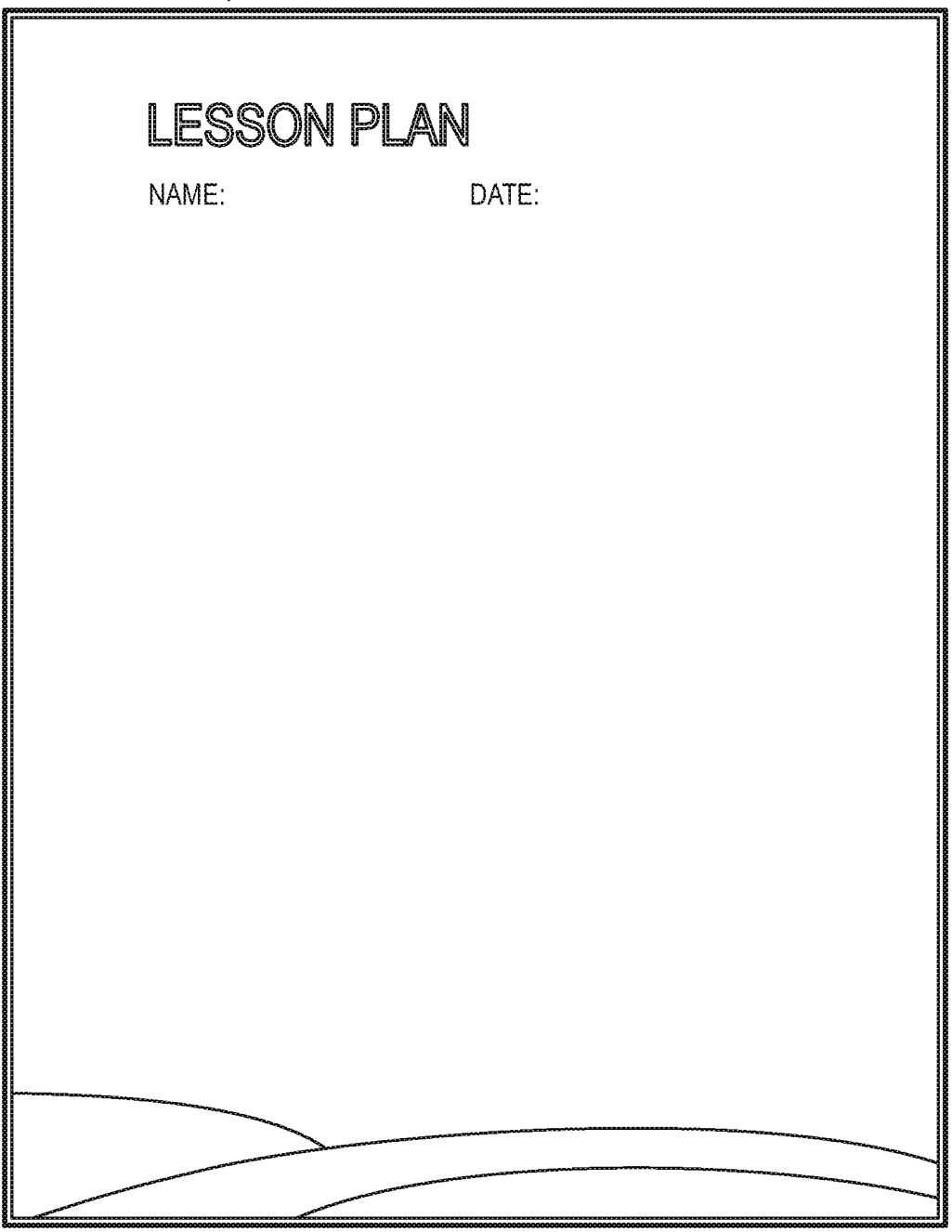
FIG. 11 depicts an example foreground image of the third iteration of the iterative document decomposition process, according to some embodiments.
Figure 12:
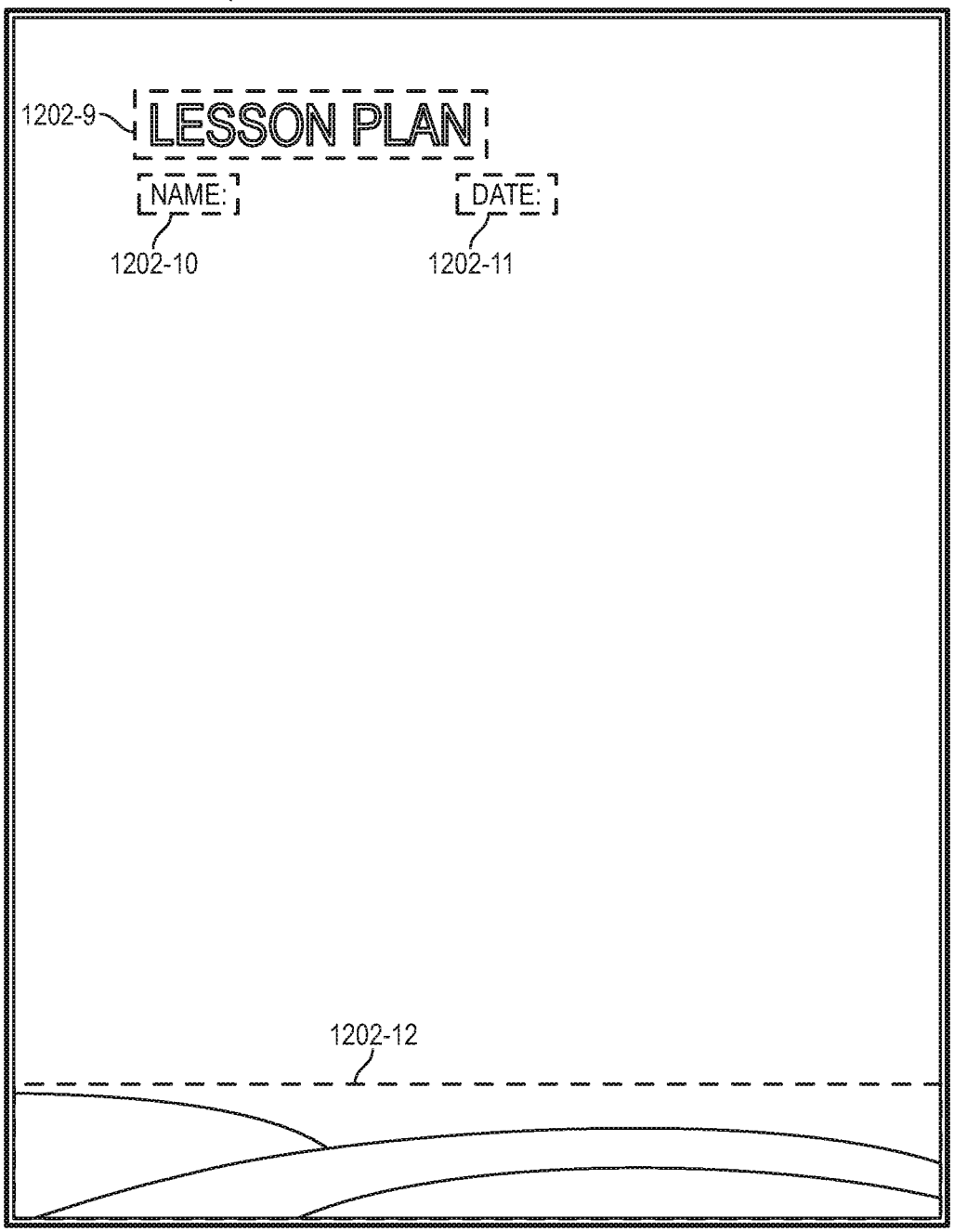
FIG. 12 depicts detection of content elements in the example foreground image of the third iteration of the iterative document decomposition process, according to some embodiments.
Figure 13:
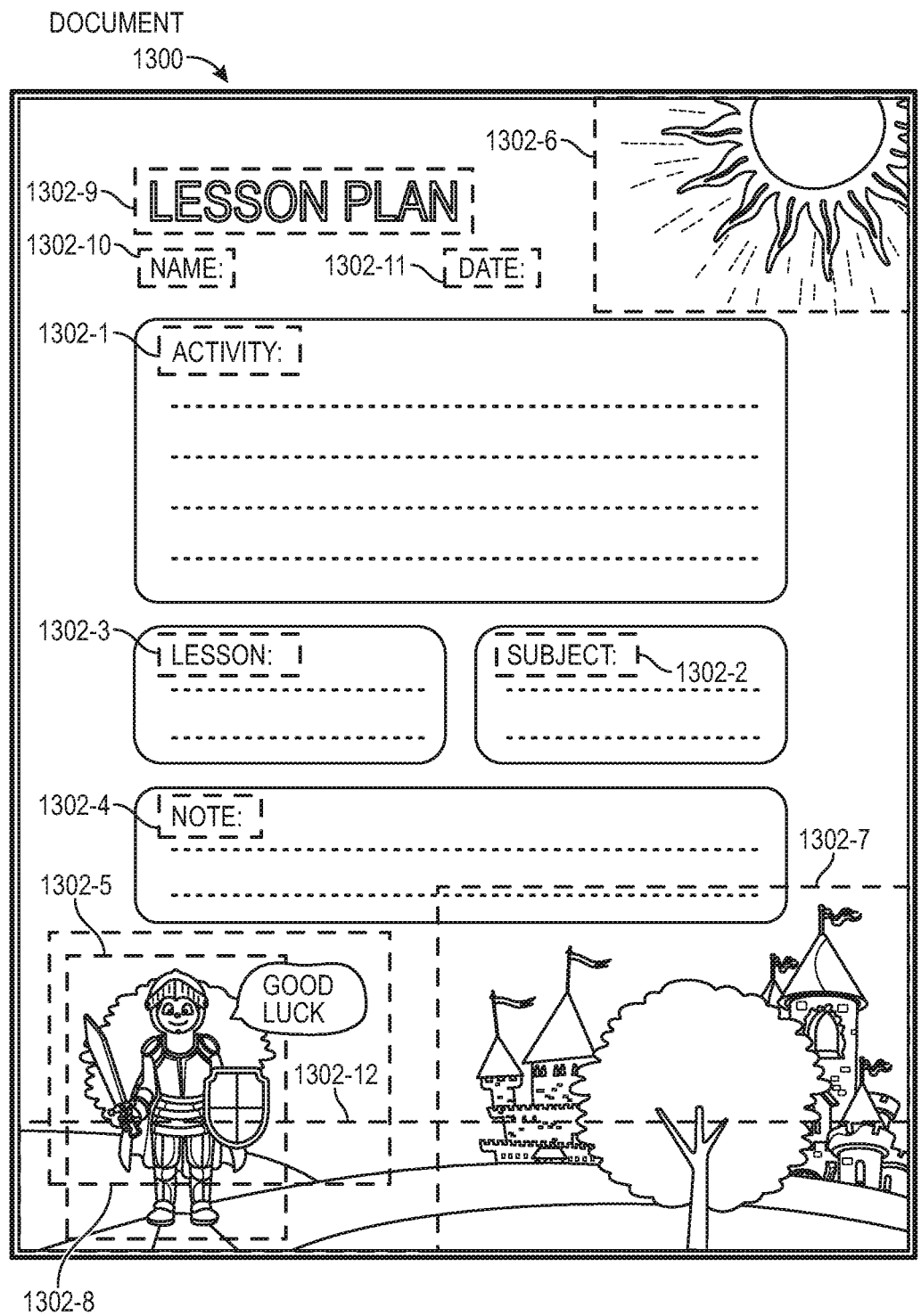
FIG. 13 depicts an example final result of the iterative document decomposition process, according to some embodiments.

As an example of iterative process 300, consider the example iterative document decomposition depicted in FIG. 4 through FIG. 13. FIG. 4, FIG. 5, and FIG. 6 depict a first example iteration, FIG. 7, FIG. 8, and FIG. 9 depict a second example iteration, FIG. 10, FIG. 11, and FIG. 12 depict a third example iteration, and FIG. 13 depicts an example final result.

In the first example iteration, a current document is rendered 306 as document image 400. The foreground is separated 308 from document image 400. Content objects of the current document that are in the foreground are determined 310. The foreground content objects are rendered 312 as foreground image 500 of FIG. 5. Content elements 602 are detected or segmented 314 in foreground image 600 of FIG. 6, which corresponds to foreground image 500 of FIG. 5. Those content objects of the foreground content objects determined 310 to be in the foreground in the first example iteration that correspond to detected or segmented 314 content elements 602 are determined 316.

At decision 318 of the first example iteration, it is determined that more iterations are to be performed. Accordingly, a new current document is generated 320 based on the current document for the first iteration that corresponds to the current document for the first iteration but with the corresponding foreground content objects determined 316 in the first example iteration removed. At 322, the current document is set to the new current document generated 320 before proceeding with the second example iteration.

In the second example iteration, the current document is rendered 306 as document image 700 of FIG. 7. The foreground is separated 308 from document image 700. Content objects of the current document that are in the foreground are determined 310. The foreground content objects are rendered 312 as foreground image 800 of FIG. 8. Content elements 902 are detected or segmented 314 in foreground image 900 of FIG. 9, which corresponds to foreground image 800 of FIG. 8. Those content objects of the foreground content objects determined 310 to be in the foreground in the second example iteration that correspond to detected or segmented 314 content elements 902 are determined 316.

At decision 318 of the second example iteration, it is determined that more iterations are to be performed. Accordingly, a new current document is generated 320 based on the current document for the second iteration that corresponds to the current document for the second iteration but with the corresponding foreground content objects determined 316 in the second example iteration removed. At 322, the current document is set to the new current document generated 320 before proceeding with the third example iteration.

In the third example iteration, the current document is rendered 306 as document image 1000 of FIG. 10. The foreground is separated 308 from document image 1000. Content objects of the current document that are in the foreground are determined 310. The foreground content objects are rendered 312 as foreground image 1100 of FIG. 11. Content elements 1202 are detected or segmented 314 in foreground image 1200 of FIG. 12, which corresponds to foreground image 1100 of FIG. 11. Those content objects of the foreground content objects determined 310 to be in the foreground in the third example iteration that correspond to detected or segmented 314 content elements 1202 are determined 316.

At decision 318 of the third example iteration, it is determined that no more iterations are to be performed (e.g., because the background separated from foreground image 1100 of FIG. 11 has little or no content). Accordingly, the corresponding content objects determined 316 in the first, second, and third iterations are combined 324 into a final result depicted in FIG. 13.

FIG. 13 depicts the example document according to the final result. Each labeled box corresponds to a determined 316 content object during the first, second, and third iterations. In particular, determined 316 text content object 1302-1 corresponds to detected or segmented 314 content element 602-1 of FIG. 6, determined 316 text content object 1302-2 corresponds to detected or segmented 314 content element 602-2 of FIG. 6, determined 316 text content object 1302-3 corresponds to detected or segmented 314 content element 602-3 of FIG. 6, determined 316 text content object 1302-4 corresponds to detected or segmented 314 content element 602-4 of FIG. 6, determined 316 vector graphics content object 1302-5 corresponds to detected or segmented 314 content element 602-5 of FIG. 6, determined 316 vector graphics content object 1302-6 corresponds to detected or segmented 314 content element 902-6 of FIG. 9, determined 316 vector graphics content object 1302-7 corresponds to detected or segmented 314 content element content element 902-7 of FIG. 9, determined 316 vector graphics content object 1302-8 corresponds to detected or segmented 314 content element content element 902-8 of FIG. 9, determined 316 text content object 1302-9 corresponds to detected or segmented 314 content element 1202-9 of FIG. 12, determined 316 text content object 1302-10 corresponds to detected or segmented 314 content element 1202-10 of FIG. 12, determined 316 text content object 1302-11 corresponds to detected or segmented 314 content element 1202-11 of FIG. 12, and determined 316 vector graphics content object 1302-12 corresponds to detected or segmented 314 content element 1202-12 of FIG. 12.

From this example, several advantages conferred by the iterative decomposition approach can be seen. For one, the approach can detect entire logical content objects including those drawn by vector graphics drawing instructions. For example, the vector graphics drawings of the knight, the sun, and the castle are detected in their entirety as separate content objects. For another advantage, the approach can detect entire logical content objects that underlie other content objects in the logical visual layering. For example, the vector graphics drawing of the knight is detected as a separate content object from the vector graphics drawing of the tree behind the knight. For yet another advantage, a detected content object can be individually selected (e.g., for editing the selected content object). For example, a user may individually select any of the text content objects 1302-1, 1302-2, 1302-3, 1302-4, 1302-9, 1302-10, or 1302-11 or any of the vector graphics content objects 1302-5, 1302-6, 1302-7, 1302-8, or 1302-12.

In some embodiments, the final result encompasses annotating detected content objects in the document. The annotations for a detected content object encompass metadata that identifies the instructions or data of the document for rendering the content object. For example, the annotations may encompass tags, markup, or other identification data stored in or external to the document that identifies the instructions or data of the document for rendering the content object. For example, for a text content object, an annotation may identify the text of the document belonging to the content object. Additionally, the annotation may identify text formatting properties of the text such as font and font size. For a raster image content object, an annotation may identify the instructions or data for rendering the image which may encompass the data of the image itself or encompass a link or reference to a file or network or database resource containing the image data. Additionally, the annotation may identify image formatting properties such as the size (dimensions) of the image. For vector graphics content objects, an annotation may identify the vector objects and associated instructions or data of the document for drawing the content object.

The annotations can be used when displaying the final result. The annotations can be used to visually indicate the content objects detected. FIG. 13 shows one way this can be done using bounding boxes around the content elements corresponding to the detected content objects. A bounding box may also be associated with a displayed label. The displayed label can identify the text of content object detected (e.g., "text," "image," etc.). The displayed label can also indicate what logical visual layer the associated content object belongs to. For example, a layer ordinal such as "Layer 1," "Top Layer," "Layer 2," "1," "2", etc. could be used to indicate the logical visual layer. Additionally or alternatively, coloring of the bounding boxes could be used. For example, the bounding boxes surrounding content objects 1302-1, 1302-2, 1302-3, 1302-4, and 1302-5 could all be a same first color to indicate those content objects all belong to a same first logical visual layer. The bounding boxes surrounding content objects 1302-6, 1302-7, and 1302-8 could all be a same second color different from the first color to indicate those content objects all belong to a same second logical visual layer that is not the first logical visual layer. The bounding boxes surrounding content objects 1302-9, 1302-10, 1302-11, and 1302-12 could all be a same third color different from the first and second colors to indicate those content objects all belong to a same third logical visual layer that is not the first or second logical visual layer.

Returning to the top of process 300, a document to be decomposed into its constituent content objects is obtained 302. The document can be obtained 302 by various components in a computing system. For example, the document can be obtained 302 by an end-user computing device such as, for example, a desktop computer designed to be used at a desk or workstation; a laptop computer designed to be carried around and used on the go; a tablet computer designed to be used with a touchscreen; a smartphone or mobile device used to access a variety of computing resources, including the internet, email, and social media; a gaming console or other specialized computing device designed primarily for gaming; or a smart television (TV) with built-in computing capabilities, allowing access to streaming video and other online content.

The document can be obtained 302 by a server computing device designed to provide computing resources to other computers and devices on a network such as, for example, a web server that hosts websites and web applications, allowing users to access them over the internet; a database server that stores and manages data for applications and other computers on a network; a file server that stores and manages files and other data, allowing other computers on a network to access and share them; an application server that provides access to specific applications or software programs for other computers on a network, or a cloud server or virtualized server that is hosted in a data center and provides computing resources and services to users over the internet or other network.

The document obtained 302 can be one of various types of documents. In particular, the document may conform to one of various types of electronic document formats including, but not limited to, any of: PDF, EPUB, XPS, or HTML. PDF stands for "Portable Document Format" and is a file format used for presenting documents, including text formatting and images, in a manner independent of the software, hardware, and operating system used to create or view the document. EPUB stands for "Electronic Publication," and is a standard file format used for e-blocks. EPUB is designed for reflowable content where text and images in an EPUB can be adjusted to fit the screen size and preferences of the user for readability on a variety of end-user computing devices. XPS stands for "XML paper specification," which is a fixed-layout document format like PDF. A XPS document can contain text, images, and other types of content, and can be viewed and presented with consistent formatting access different devices and platforms. HTML stands for "Hypertext Markup Language" and is a markup language used to create and format content on the World Wide Web. HTML is a standard language used to create web pages and other types of web content, such as forms, images, and multimedia.

The document obtained 302 can contain various types of content including any or all of: text, images, audio, video, interactive forms, or links. Text includes a sequence of characters, symbols, or words that convey meaning or information. Images include a raster image or a vector graphics image, including a photograph, a logo, an icon, or an illustration. A raster image can be formatted according to an image format standard such as, for example, any of: a Joint Photographic Experts Group (JPEG) standard, a Portable Network Graphics (PNG) standard, or a Graphics Interchange Format (GIF) standard. A vector graphics image can be drawn according to a set of drawing instructions that include mathematical formulas the define lines, shapes, and curves where the set of drawing instructions conform to a vector graphics standard such as, for example, any of: a Scalable Vector Graphics (SVG) standard, an ADOBE ILLUSTRATOR (AI) standard, or an Encapsulated PostScript (EPS) standard. An image can be embedded directly in the document or linked to an external file. Audio includes an audio file, such as a sound effect, music, or narration that is added to the document as an annotation or an embedded media element. Video includes a video file, such as an instructional video, a product demonstration, or animation added to the document as an annotation or an embedded media element. An interactive form allows a user to fill in a field, select an option, and submit data. An interactive form can encompass any or all of: a text field, a check box, a radio button, or a drop-down menu. Links include a hyperlink to another page within the document or to an external website, email address, or file.

The document obtained 302 can be a layered document composed of multiple defined layers depending on the document format type. For example, each layer can be defined according to a method for defining layers in the document according to the document format type. For example, layers or content within each layer can be defined according to a z-ordering or grouping. Each defined layer can have different content such as text, raster image, and vector image content. The purpose of the defined layers can be varied. For example, the defined layers may allow content in one defined layer to be edited or manipulated independently of content in other defined layers. The defined layers may allow greater control over individual content in the document. The defined layers may be used to organize content of the document, such as, for example, to separate text from images. The defined layers may be used to separate different components of an architectural, engineering, or construction design. The defined layers may be used to control the visibility or appearance of specific content, such as images or text. A defined layer may sometimes be referred to as a "content group" or an "optional content group."

The iterative document decomposition techniques herein identify a logical visual layering of document content that may correspond to, but that is nonetheless distinct from, any defined layers of the document. It is distinct because of the manner by which the logical visual layering is determined. In particular, the logical visual layering is determined according to the iterative document decomposition approach disclosed herein as opposed to being based solely on parsing or otherwise computationally processing the instructions and data of the document to determine the layers defined therein.

The document can be obtained 302 at various locations in a computing system. For example, the document can be obtained 302 at the edge of a network (e.g., the internet). The edge of a network may correspond to an outermost part of the network where computing devices such as, for example, end-user devices (e.g., smartphones, laptops, and desktop computers) connect to the network. The edge of the network includes routers, switches, and other network infrastructure devices that allow communication between the end-user devices or other devices in the wider network such as, for example, network infrastructure devices that implement the edge portion of a Content Delivery Network (CDN). Alternatively, the document can be obtained 302 at the core of the network such as at a cloud server in a data center.

The document can be obtained 302 at various times in a computing system. For example, the document can be obtained 302 when a user takes some action on the document using an application such as a document reading application, a document editing application, or other software program or application. The user requested action can be varied. For example, the user may request or command the application to open, share, import, export, view, edit, download, upload, decompose, or take other suitable action on the document by directing appropriate user input to the application (e.g., text input, mouse or touchpad input, touchscreen input, voice input, gestural input, etc.). Based on the user input, the application may obtain 302 the document or may cause another application (e.g., a cloud service) to obtain 302 the document.

The document can be obtained 302 for various reasons. One reason the document may be obtained 302 is for editing the document. For example, a user may wish to use a document editing application to edit or modify particular content of the document. In this case, the iterative decomposition techniques disclosed herein can be used by the document editing application to identify the particular content and make it selectable by the user with appropriate user input to the document editing application. The techniques can do this regardless of the type of the particular content (e.g., text, raster image, or vector graphics image) and even if the particular content is partially obscured by other content of the document that is higher in the visual hierarchy of the document content.

The document can be obtained 302 in various manners. The document can be obtained 302 by creating a new document using a document processing application such as a new document created from a pre-existing document template that populates the new document with initial content. For example, the document can be obtained 302 and the iterative decomposition techniques disclosed herein applied by a document processing application when creating a new document from a pre-existing "lesson plan" template that includes grade school lesson plan content such as depicted in FIG. 13. The document can be obtained 302 by opening an existing document such as one stored in a computer file system or in a network-connected file system in the cloud and using a file manager application to open the document or opening the document from within the document processing application used to create or edit it. The iterative document decomposition techniques disclosed herein can be applied in response to opening an existing document. The document can be obtained 302 by importing the document from another application or file format into a document processing application. For example, the document can be obtained 302 and the iterative document decomposition techniques disclosed herein applied by a document processing application when importing the document as one file type into the application as another document file type (e.g., PDF). The document can be obtained 302 by receiving it from another user or another computer system such as via email, instant messaging, or a file-sharing platform. Once received, the document can be downloaded to (uploaded to) a user's computer or to a cloud server. The iterative document decomposition techniques disclosed herein can be applied in response to downloading or uploading the document to the user's computer or the cloud server.

Turning now to operation 304 of iterative process 300, a "current document" variable for iterative process 300 is set to the document obtained 302. Operations 306-316 are part of an iteration of iterative process 300. Iterative process 300 may encompass one or more iterations to decompose the obtained 302 document into constituent document objects. In the following discussion of iterative process 300, the term "current" is used to refer to the iteration currently being performed as part of iterative process 300. The current iteration is performed on the current document which initially is the document obtained 302 for the first iteration of iterative process 300.

At operation 306, the current document is rendered as a document image. For example, the document image can be of the entire current document or of a page, a slide, a section, or other portion of the current document. The document image can be a raster image such as, for example, a JPEG, PNG, or BMP image. The current document can be rendered as a document image using a document processing application capable of rendering content of the current document according to the instructions and data of the current document and a virtual framebuffer or other suitable software technology that emulates the functionality of a software graphics card and display, allowing the software to render images and graphics without using a physical display screen. The output of the virtual framebuffer can be an image file or other data container containing the document image. The virtual framebuffer can be implemented as a kernel module or as part of an operating system's graphics stack.

At operation 308, the foreground of the document image is separated from the background of the document image. In some embodiments, machine learning is used. For example, a supervised learning approach can be used where a machine learning model is trained to classify pixels in images as foreground or background. The supervised learning approach uses a labeled dataset of images where pixels are labeled as foreground or background. A deep machine learning model such as a convolutional neural network (CNN) is trained based on the labeled dataset to learn the features that distinguish foreground from background. The trained model can be applied to the document image to determine pixels of the document image that are in the foreground of the document image and pixels of the document image that are in the background of the document image. The trained model may output a mask that contains a value for each pixel in the document image that indicates whether the pixel is in the foreground (e.g., value=1) or in the background (e.g., value=0). The portion of the mask that indicates the pixels that are in the foreground is referred to herein as the "foreground" mask.

Approaches other the supervised learning can be used to separate the foreground from the background of the document image. For example, an unsupervised learning approach, an object detection approach, or a semantic segmentation approach can be used. With an unsupervised learning approach, a clustering algorithm is used such as k-means or hierarchical clustering to group pixels with similar attributes (e.g., colors, textures, and edge information). Once pixels of the document image are clustered, labels can be assigned to each cluster based on its properties. The foreground clusters can then be separated from the background clusters based on the cluster labels. The output of an unsupervised learning approach applied to the document image can also be a mask like with a supervised learning approach.

With an object detection approach to foreground and background separation, an object detection machine learning model is used to detect elements of interest in the document image. An existing object detection machine learning model can be used such as, for example, any of: YOLO (You Only Look Once), Faster R-CNN (Region-based Convolutional Neural Network), SSD (Single Shot Detector), or other suitable object detection machine learning model. Once the object detection model is trained, the trained model can be used to detect and localize content elements in the document image. The trained model can output a bounding box around each content element detected in the document image. Once content elements are detected in the document image, the elements in the foreground can be separated from the elements in the background using the bounding boxes. The output of the object detection approach can also be a mask generated based on the bounding boxes that specify which pixels of the document image are in the foreground and which are in the background.

With a semantic segmentation approach, a class label is assigned to each pixel in the document image. A semantic segmentation approach can separate the foreground from the background of the document image by assigning different class labels to the foreground and background pixels. A labeled dataset of images may be used where each pixel is labeled as foreground or background. A semantic segmentation model is trained based on the labeled dataset of images. For example, a U-Net, Mark R-CNN, or DeepLab semantic segmentation model may be trained. Once the semantic segmentation model is trained, it can be used to segment the foreground from the background of the document image. The output of the semantic segmentation model can be a mask that specifies which pixels of the document image are in the foreground and which are in the background.

With any of the above-separation approaches, one or more post-processing operations can be applied to the mask to refine the mask such as erosion and dilation to remove noise or to fill gaps in the mask.

At operation 310, content objects of the current document that are in the foreground of the current document are determined. A "content object" refers to a logical piece of content contained in a document. A content object can have a content type. For example, a content object can be any of:

text such as a set or sequence of one or more formatted text characters of the document formatted according to one or more text properties such as font, size, color, bold, italic, underline, strikethrough, alignment, line spacing, character spacing, indentation, or other suitable text formatting property;

a raster image such as a JPEG, a PNG, or a BMP image;

a vector graphics image or drawing such as one drawn or rendered according to SVG, AI, or EPS vector graphics drawing instructions;

audio such as uncompressed audio (e.g., WAV, AIFF, etc.); lossy compressed audio (e.g., MPS, AAC, WMA, etc.); lossless compressed audio (e.g., FLAC, ALAC, etc.); or streaming audio transmitted in real-time over a network;

video such as uncompressed video (e.g., RAW, DPX, PRORES, etc.); lossy compressed video (e.g., MP4, H.264, HEVC, etc.); lossless compressed video (e.g., FFFV1, etc.); or streaming video transmitted in real-time over a network; or a link such as a hyperlink, a cross-reference, a bookmark, an internal link, or an external link.

A content object in the current document corresponds to instructions and data of the current document for rendering the content object. For example, text of the current document may be associated in the current document with instructions or data specifying any or all of:

the font family and size to be used for rendering the text;

text formatting properties such as, for example, bold, italic, underling, strikethrough, color, alignment, etc;

the spacing between lines of text and between paragraphs;

the direction of the text, such as left-to-right or right-to-left; how the text such wrap around images or other content of the document;

margins and indentations for the text;

the formatting for lists and tables, including bullet points, numbering, and cell bords;

or any other suitable text rendering instructions or data.

A raster image of the current document may be associated in the current document with instructions or data specifying any or all of:

the image format, such as JPEG, PNG, or GIF;

the dimensions of the image, including height and width in pixels or other unit of measurement;

the resolution of the image as measured in dots per inch (DPI) or pixels per inch (PPI);

the level of compression used for the image, which affects the file size and image quality;

the alignment of the image within the document, such as left, center, or right;

alternative text for the image, which is displayed if the image cannot be loaded or if the user is using a screen reader;

a hyperlink to another page or website associated with the image;

or any other suitable raster image rendering instructions or data.

A vector graphics image of the current document may be associated in the current document within instructions or data specifying any or all of:

the vector format used such as SVG, AI, or EPS;

the individual vector objects that make up the image, such as lines, curves, shapes, and text;

the properties of each vector object, such as color, stroke, file, opacity, and blending mode;

the transformations applied to the vector objects, such as scaling, rotating, skewing, or shearing;

the layering and grouping of vector objects, allowing for complex compositions;

text as vector objects that allows for precise control over the appearance and layout of the text;

vector effects, such as gradients, shadows, and transparencies, to enhance the appearance3 of the vector graphics image; or any other suitable vector graphics image rendering instructions or data.

Audio content of the current document may be associated in the current document with instructions or data specifying any or all of:

the audio format of the audio content, such as WAV, MP3, or OGG VORBIS;

the encoding used for the audio, such as uncompressed or lossy compression;

the bitrate used for the audio, which affects the file size and quality;

the sampling rate used for the audio, which affects the frequency range and quality;

the number of audio channels used, such as mono or stereo;

metadata associated with the audio, such as title, artist, album, and genre;

controls for the audio, such as play, pause, stop, volume, and seek; or any other suitable audio rendering instructions or data.

Video content of the current document may be associated in the current document with instructions or data specifying any or all of:

the video format used, such as MP4, AVI, or MOV;

the video codec used for the video, such as H.264 or HEVC;

the bitrate used for the video, which affects the video size and quality;

the resolution of the video, which affects the clarity and sharpness of the video;

the frame rate of the video, which affects the smoothness and fluidity of motion in the video;

the audio codec used for audio in the video, such as AAC or MPS;

the bitrate used for audio in the video, which affects the audio size and quality;

closed captions for the video, providing text for users who are deaf or hard of hearing;

controls for the video, such as play, pause, stop, volume, and seek; or any other suitable video rendering instructions or data.

Link content of the current document may be associated in the current document with instructions or data specifying any or all of:

the text that will be displayed for the link;

the URL or web address that the link will point to;

the type of link, such as a standard hyperlink, an anchor link, or a mailto link;

the target of the link, such as opening the link in the same window, a new window, or a new tab;

the styling of the link, such as underling, color, or hover effects;

attributes for the link, such as a title attribute or aria-label, to assist users with disabilities; or any other suitable link rendering instructions or data.

A content object of the current document may be identified according to the iterative document decomposition techniques disclosed herein. However, the techniques do not require that instructions or data of the current document for rendering a content object be designated or grouped as such in the document. The disclosed techniques identify logical groups and layers of instructions and data of the document that render a content object based on how the content object is rendered and without requiring the instructions or data to be grouped or labeled as a content object within the document.

A content object of the current document has a rendering area when rendered according to its instructions or data of the current document. For text, raster image, audio, video, and link content objects, the rendering area may be defined by a rectangular area of pixels that enclose the content object corresponding to the area of the rendered document where the content object is rendered. For vector graphics content objects, the rendering area may be defined by the area of pixels covered by the vector objects that make up the vector graphics content object, such as the lines, curves, shapes, or text of the vector graphics content object.

At operation 310, a content object of the current document may be determined to be in the foreground of the current document if the foreground of the document image according to the mask separated from the document image at operation 308 covers at least a threshold amount of the rendering area of the content object. For example, for text, raster image, audio, video, and link content objects, the content object may be determined to be in the foreground if at least a threshold percentage of the pixels within the rendering area of the content object are covered by pixels of the mask designated as in the foreground. If less than the threshold percentage of the pixels within the rendering area of the content object is covered by pixels of the mask designated as in the foreground, then the content object may be determined to not be in the foreground of the current document. In some embodiments, the threshold percentage is fifty percent but could be greater according to the requirements of the particular implementation at hand. For example, the threshold percentage could be sixty percent, seventy percent, or ninety percent. For vector graphics content objects, vector objects such as lines, curves, shapes, or text may be determined to be in the foreground of the current document on an individual basis. For example, each the rendering area of each line, curve, shape, or text and the vector object determined to be in the foreground of the current document if at least a threshold percentage of the rendering area of the vector object is covered by pixels of the mask designated as in the foreground.

There are other ways to determine the rendering area of a content object or a vector object that can be used at operation 310. For example, the smallest rectangle that fully encloses the content object or vector object can be determined. The rendering area of that smallest rectangle can be used as the rendering area of the content object or the vector object. As another example, the path length of a content object or a vector object can be used. The path length can be converted to a unit of rendering area such as square pixels to estimate the total rendering area covered by the content object or the vector object. As yet another example, the clipping mask of a content object or a vector object that defines the visible area of the content object or the vector object can be used. The rendering area of the clipping mask can be used as the rendering area of the content object or the vector object. As still yet another example, the content object or the vector object can be rasterized as a bitmap image, which can then be measured in terms of pixel area or pixel count. The rendering area of the bitmap image can be used as the rendering area of the rasterized content object or vector object.

Once the content objects of the current document in the foreground are determined 310, then those foreground content objects can be rendered 312 as a foreground image. For example, the foreground image can be an image of only the foreground content objects as rendered according to their instructions or data of the current document. The foreground image can be a raster image such as a JPEG, PNG, or BMP image. The foreground content objects of the current document can be rendered as a foreground image using a document processing application capable of rendering content of the current document according to the instructions or data of the current document and a virtual framebuffer or other suitable software technology that emulates the functionality of a software graphics card and display, allowing the software to render images and graphics without using a physical display screen. The output of the virtual framebuffer can be an image file or other data container containing the foreground image.

Once the foreground content objects are rendered 312 as the foreground image, content elements in the foreground image are detected or segmented from the foreground image. As used herein, a content element detected or segmented from the foreground image may correspond to, but is nonetheless distinct from, a content object in the current document. In particular, a content element refers to an area of the foreground image where content is detected or segmented in the foreground image whereas a content object refers to instructions or data of the current document for rendering the detected or segmented content.

Content elements are detected or segmented 314 from the foreground image using an object detection or an image segmentation technique. Object detection involves identifying the presence of content elements within the foreground image and determining their location and extent. Object detection is concerned with recognizing specific content elements within the foreground image and drawing bounding boxes around them. An object detection algorithm can output the coordinates of a bounding box around the content element, along with a probability score that indicates how certain the algorithm is that the content element is present. Image segmentation, on the other hand, involves dividing the foreground image into multiple segments or regions, each of which corresponds to a different content element. An image segmentation algorithm can output a pixel-level mask that indicates which pixels in the foreground image belong to which segment.

At operation 314, object detection may be used to identify and localize content elements in the foreground image. Object detection may involve using a pre-trained object detection model such as, for example, a pre-trained deep learning model. For example, a pre-trained Faster R-CNN, SSD, or YOLO model can be used or adapted for the specific task at hand. For example, a pre-trained deep learning model can be used as is or trained (fine-tuned) based on a domain-specific training data set to detect a domain-specific set of content elements in the foreground image. The output of the object-detection model as applied to the foreground image can encompass a set of bounding boxes around each content element detected in the foreground image. Each bounding box may be associated in the output with a label indicating the type of content element detected and a probability score indicating how confident the object detection model is in the detection. The object detection model may be trained to detect different types of content elements in the foreground image including, but not limited to:

text regions in the foreground image, such as paragraphs, headings, or captions;
table regions in the foreground image;
image regions in the foreground image, such as raster images, vector graphics images, figures, or diagrams;
symbols in the foreground image, such as mathematical symbols, punctuation marks, or icons;
handwritten text regions in the foreground image; or
any other suitable type of content element that may appear in the foreground image.

At operation 314, image segmentation may be used to segment a content element from the foreground image. Image segment may involve using a pre-trained image segment model such as, for example, a pre-trained deep learning model. For example, a pre-trained U-NET, MASK R-CNN, or Fully Convolutional Network (FCNS) model can be used or adapted for the specific task at hand. For example, a pre-trained deep learning model can be used as is or trained (fine-tuned) based on a domain-specific training data set to detect a domain-specific set of content elements in the foreground image. The output of an image segmentation model as applied to the foreground image can encompass a mask that identifies a set of pixels (segments) in the foreground image that belong to a particular content element. Each segment may be associated in the output with a label indicating the type of content element segmented and a probability score indicating how confident the image segmentation model is in the segmentation. Like with objection detection, the image segmentation model may be trained to segment different types of content elements from the foreground image including, but not limited to, text regions, table regions, image regions, symbols, handwritten text, or any other suitable type of content element that may appear in the foreground image.

Once content elements are detected or segmented 314 in the foreground image, foreground content objects of the current document that are rendered 312 in the foreground image and that correspond to content elements detected or segmented 314 are determined 316. This determination 316 can be based on rendering area. In particular, the rendering area of a content element detected or segmented 314 is determined and the rendering area of foreground content object that is rendered 312 in the foreground image is determined. If the rendering areas overlap, then the content object may be determined to correspond to the content element. In some embodiments, a content object is determined to correspond to a detected or segmented content element if the rendering area of the content element is entirely within or substantially within the rendering area of the content object. For example, the content object can be determined to correspond to the content element if at least a threshold percentage of the rendering area of the content element (e.g., greater then seventy, eighty, or ninety percent) is within the rendering area of the content object. Otherwise, the content item is determined not to correspond to the content element. In some embodiments, a content object is determined to correspond to a detected or segmented content element if the rendering area of the content object is entirely within or substantially within the rendering area of the content element. For example, the content object can be determined to correspond to the content element if at least a threshold percentage of the rendering area of the content object (e.g., greater than seventy, eighty, or ninety percent) is within the rendering area of the content element. Otherwise, the content item is determined not to correspond to the content element.

In some embodiments, only the content of a content object that is rendered within or substantially within the rendering area of a content element is determined to correspond to the content element. For example, a text, raster image, audio, video, or link content object may be determined to correspond to a content element if at least a threshold percentage of the rendering area of the content object is covered by the rendering area of the content element. Otherwise, the content object is not determined to correspond to the content element but might correspond to another content element. For example, the threshold percentage can be fifty, sixty, seventy, eight, or ninety percent or other suitable percentage. For vector graphics, the rendering area of vector objects having at least a threshold percentage of their rendering area covered by the rendering area of the content element may collectively be determined to correspond to the content element as a vector graphics content object. Otherwise, the vector objects that do not have at least the threshold percentage of their rendering area covered by the content element are not determined to correspond to the content element but might correspond to another content element.

As an example, referring to FIG. 6, the text content object encompassing the text "Activity:" is determined to correspond to content element 602-1, the text content object encompassing the text "Subject:" is determined to correspond to content element 602-2, the text content object encompassing the text "Lesson:" is determined to correspond to content element 602-3, the text content object encompassing the text "Note:" is determined to correspond to content element 602-04, and the vector objects that collectively draw the knight are determined to correspond to content element 602-5.

At decision 318, a determination is made whether more iterations should be performed. This determination can be made based on the mask determined at operation 308 of the current iteration (the iteration just completed). The document image rendered at operation 306 from which the mask is determined 308 has a number of pixels. If more than a threshold number or threshold percentage of pixels of the document image are indicated by the mask to be in the foreground, then it can be determined at decision 318 that no more iterations are to be performed. Otherwise, at least one more iteration is performed. For example, foreground image 1100 of FIG. 11 compared with document image 1000 of FIG. 10 indicates that all or substantially all pixels of document image 1000 are in the foreground. As such, decision 318 determines that no further iterations are to be performed after the third iteration.

If, at decision 318, it is determined that another iteration is to be performed, then, at operation 320, a new document is generated based on the current document. The new document is generated to have the content of the current document minus the content objects determined 310 to be in the foreground of the current document. For example, the new document can be generated by removing or disabling the instructions or data of the foreground content objects in the current document. At operation 322, the new document generated is set as the current document before proceeding with the next iteration.

On the other hand, if, at decision 318, it is determined that no more iterations are to be performed, then the content objects determined to correspond to content elements across are iterations are combined into a final result. The combining may include annotating, tagging, or otherwise grouping the instructions or data of the corresponding content objects in the original document obtained 302. The annotating, tagging, or grouping data can be embedded in the document itself or can be stored as separate metadata.

By annotating, tagging, or grouping the instructions or data of the corresponding content objects, the instructions or data of each corresponding content object can be identified as an entire content object and operated upon such as, for example, in response to a user selection of the content object. For example, referring to FIG. 13, selection of content object 1302-9 by a user using a document processing application may allow the user to use the document processing application to edit (change) the text of content object 1302-9 or to edit or change one or more text formatting properties of the text. As another example, selection of content object 1302-6 by a user using the document processing application may allow the user to use the document processing application to edit (modify) the vector graphics image of the sun such as, for example, by changing the color of the image or by editing one or more individual vector objects that make up the drawing of the sun. A selection of a content object by a user using a document processing application can also be performed to copy or cut the content object from the document and paste into another document. It should also be noted that because of the iterative decomposition approach, content objects that visually underlie other content objects can be selected independent of the content objects that visually overlay them. For example, content object 1302-8 encompassing the vector graphics image of the tree and the "Good Luck" speech bubble can be separately selected for editing from content object 1302-5 encompassing the vector graphics image of the knight, and vice versa.

Example Document Decomposition System

Figure 14:
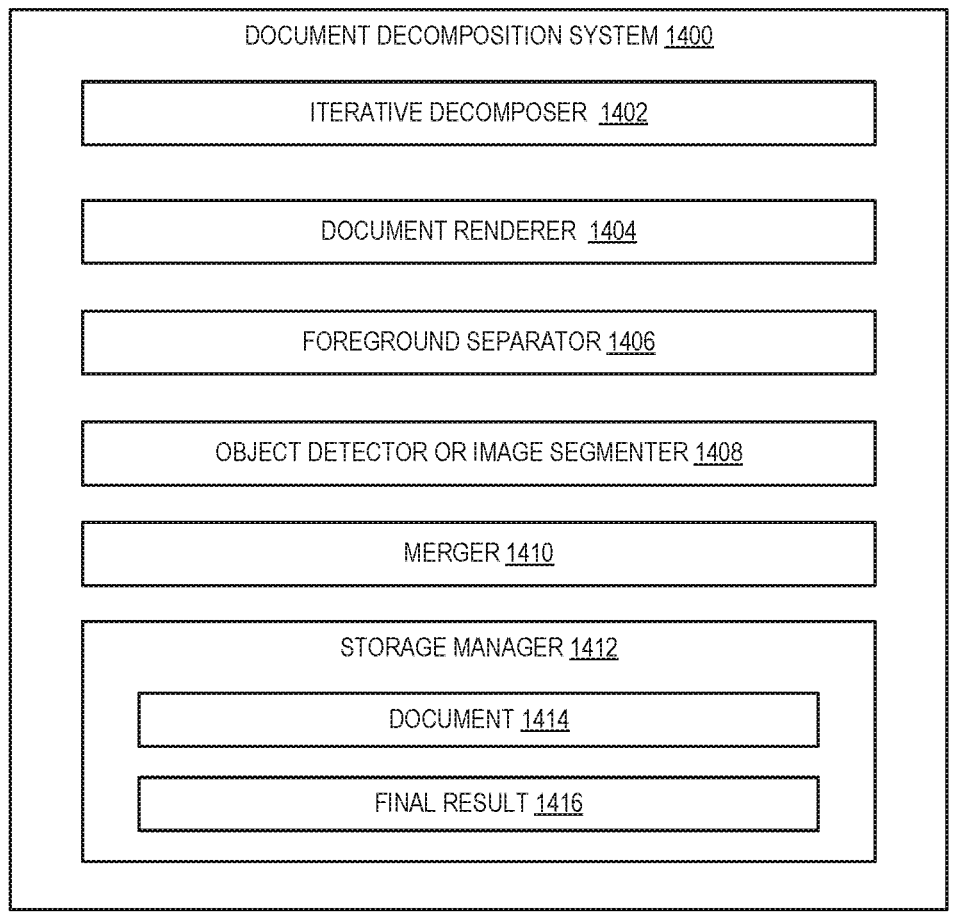
FIG. 14 illustrates a schematic diagram of an iterative document decomposition system, according to an embodiment.

FIG. 14 illustrates a schematic diagram of document decomposition system 1400 described above in accordance with an embodiment. As shown, document decomposition system 1400 includes iterative decomposer 1402, document renderer 1404, foreground separator 1406, object detector or image segmenter 1408, merger 1410, and storage manager 1412 storing document 1414 and final result 1416.

Document decomposition system 1400 includes iterative decomposer 1402. Iterative decomposer 1402 decomposes document 1414 into a set of constituent content objects. Initially, iterative decomposer 1402 obtains document 1414 as the current document for the iterative decomposition process. The iterative decomposition process encompasses one or more document decomposition iterations. In each iteration, iterative decomposer 1402 uses document renderer 1404 to render the current document as a document image. Also in each iteration, iterative decomposer 1402 uses foreground separator 1406 to separate the foreground from the document image. Also in each iteration, iterative decomposer 1402 uses a foreground mask output by foreground separator 1406 to determine the content objects of the current document that are in the foreground of the current document. Also in each iteration, iterative decomposer 1402 uses document renderer 1404 to render the foreground content objects as a foreground image. Also in each iteration, iterative decomposer 1402 uses object detector or image segmenter 1408 to detect or segment content elements in the foreground image. Also in each iteration, iterative decomposer 1402 determine the foreground content elements that correspond to the detected or segmented content elements. At the end of each iteration, iterative decomposer 1402 makes a decision if more iterations are to be performed. If so, before proceeding with the next iteration, iterative decomposer 1402 generates a new document based on the current document. The new document comprises content of the current document with the corresponding content objects determined by iterative decomposer 1402 to be in the foreground during the current iteration removed. Then, iterative decomposer 1402 sets the new document to be the current document for the next iteration. On the other hand, if no further iterations are to be performed, then merger 1410 combines all corresponding content objects determined to be in the foreground across all iterations into final result 1416.

Final result 1416 encompasses data (e.g., tag data or other grouping data) that identifies the instructions or data of document 1414 that make up the set of content objects into which document 1414 is decomposed by iterative decomposer 1402. Final result 1416 can be stored as part of document 1414 (e.g., embedded within document 1414) or stored separately as metadata of document 1414. The instructions or data of each content object of the set of content objects into which document 1414 is decomposed can be separately identified by final result 1416 to enable individual selection of instructions or data of each content object of the set of content objects using a document processing application such as, for example, a word processing application or other document editing application.

Document decomposition system 1400 includes document renderer 1404. Document renderer 1404 can render the current document can as a document image using a document processing application capable of rendering content of the current document according to the instructions and data of the current document and a virtual framebuffer or other suitable software technology that emulates the functionality of a software graphics card and display, allowing the software to render images and graphics without using a physical display screen. The output of the virtual framebuffer can be an image file or other data container containing the document image. The virtual framebuffer can be implemented as a kernel module or as part of an operating system's graphics stack. Document renderer 1404 can also render content objects determined to be in the foreground of the current document as a foreground image using the document processing application and the virtual framebuffer.

Document decomposition system 1400 includes foreground separator 1406. Foreground separator 1406 separates the foreground from a document image of the current document. Foreground separator 1406 may use a machine learning-based approach to do this separation. For example, a supervised machine learning approach can be used where a machine learning model is trained to classify pixels in images as foreground or background. The supervised learning approach uses a labeled dataset of images where pixels are labeled as foreground or background. A deep machine learning model such as a convolutional neural network (CNN) is trained based on the labeled dataset to learn the features that distinguish foreground from background. The trained model can be applied to the document image to determine pixels of the document image that are in the foreground of the document image and pixels of the document image that are in the background of the document image. The trained model may output a mask that contains a value for each pixel in the document image that indicates whether the pixel is in the foreground (e.g., value=1) or in the background (e.g., value=0). The portion of the mask that indicates the pixels that are in the foreground is referred to herein as the "foreground" mask. Approaches other the supervised learning can be used to separate the foreground from the background of the document image. These other approaches may also output a mask that identifies which pixels of the document image are in the foreground and which are not in the foreground (e.g., in the background). With any of the above-separation approaches, one or more post-processing operations can be applied to the mask to refine the mask such as erosion and dilation to remove noise or to fill gaps in the mask.

Document decomposition system 1400 includes object detector or image segmenter 1408. Object detector 1408 may identify and localize content elements in the foreground image of the current document. Object detector 1408 may use a pre-trained object detection model such as, for example, a pre-trained deep learning model. For example, a pre-trained Faster R-CNN, SSD, or YOLO model can be used or adapted for the specific task at hand. For example, a pre-trained deep learning model can be used as is or trained (fine-tuned) based on a domain-specific training data set to detect a domain-specific set of content elements in the foreground image. The output of the object-detection model as applied to the foreground image can encompass a set of bounding boxes around each content element detected in the foreground image. Each bounding box may be associated in the output with a label indicating the type of content element detected and a probability score indicating how confident the object detection model is in the detection. The object detection model may be trained to detect different types of content elements in the foreground image.

Alternatively, image segmenter 1408 may segment a content element from the foreground image. Image segmenter 1408 may use a pre-trained image segment model such as, for example, a pre-trained deep learning model. For example, a pre-trained U-NET, MASK R-CNN, or Fully Convolutional Network (FCNS) model can be used or adapted for the specific task at hand. For example, a pre-trained deep learning model can be used as is or trained (fine-tuned) based on a domain-specific training data set to detect a domain-specific set of content elements in the foreground image. The output of an image segmentation model as applied to the foreground image can encompass a mask that identifies a set of pixels (segments) in the foreground image that belong to a particular content element. Each segment may be associated in the output with a label indicating the type of content element segmented and a probability score indicating how confident the image segmentation model is in the segmentation. Like with objection detector, the image segmentation model may be trained to segment different types of content elements from the foreground image including, but not limited to, text regions, table regions, image regions, symbols, handwritten text, or any other suitable type of content element that may appear in the foreground image.

Each of the components 1402-1412 of document decomposition system 1400 and their corresponding elements (as shown in FIG. 14) may be in communication with one another using any suitable communication technologies. It will be recognized that although components 1402-1412 and their corresponding elements are shown to be separate in FIG. 14, any of components 1402-1412 and their corresponding elements may be combined into fewer components, such as into a single facility or module, divided into more components, or configured into different components as may serve a particular embodiment.

The components 1402-1412 and their corresponding elements can comprise software, hardware, or both. For example, the components 1402-1412 and their corresponding elements can comprise one or more instructions stored on a computer-readable storage medium and executable by processors of one or more processing devices. When executed by the one or more processors, the computer-executable instructions of document decomposition system 1400 can cause a client device or a server device to perform the methods described herein. Alternatively, the components 1402-1412 and their corresponding elements can comprise hardware, such as a special purpose processing device to perform a certain function or group of functions. Additionally, the components 1402-1412 and their corresponding elements can comprise a combination of computer-executable instructions and hardware.

Furthermore, the components 1402-1412 of document decomposition system 1400 may, for example, be implemented as one or more stand-alone applications, as one or more modules of an application, as one or more plug-ins, as one or more library functions or functions that may be called by other applications, or as a cloud-processing model. Thus, the components 1402-1412 of document decomposition system 1400 may be implemented as a stand-alone application, such as a desktop or mobile application. Furthermore, the components 1402-1412 of document decomposition system 1400 may be implemented as one or more web-based applications hosted on a remote server. Alternatively, or additionally, the components of document decomposition system 1400 may be implemented in a suite of mobile device applications or "apps."

As shown, document decomposition system 1400 can be implemented as a single system. In other embodiments, document decomposition system 1400 can be implemented in whole, or in part, across multiple systems. For example, one or more functions of document decomposition system 1400 can be performed by one or more servers, and one or more functions of document decomposition system 1400 can be performed by one or more client devices. The one or more servers or one or more client devices may generate, store, receive, and transmit any type of data used by document decomposition system 1400, as described herein.

In one implementation, one or more client devices can include or implement at least a portion of document decomposition system 1400. In other implementations, one or more servers can include or implement at least a portion of document decomposition system 1400. For instance, document decomposition system 1400 can include an application running on one or more servers or a portion of document decomposition system 1400 can be downloaded from one or more servers. Additionally or alternatively, document decomposition system 1400 can include a web hosting application that allows the client device(s) to interact with content hosted at the one or more server(s).

The server(s) or client device(s) may communicate using any communication platforms and technologies suitable for transporting data or communication signals, including any known communication technologies, devices, media, and protocols supportive of remote data communications, examples of which will be described in more detail below with respect to FIG. 16. In some embodiments, the server(s) or client device(s) communicate via one or more networks.

A network may include a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. The one or more networks will be discussed in more detail below with regard to FIG. 16.

The server(s) may include one or more hardware servers (e.g., hosts), each with its own processing resources (e.g., processors, memory, disk space, networking bandwidth, etc.) which may be securely divided between multiple customers (e.g., client devices), each of which may host their own applications on the server(s). The client device(s) may include one or more personal computers, laptop computers, mobile devices, mobile phones, tablets, special purpose computers, TVs, or other processing devices, including processing devices described below with regard to FIG. 16.

Figure 15:
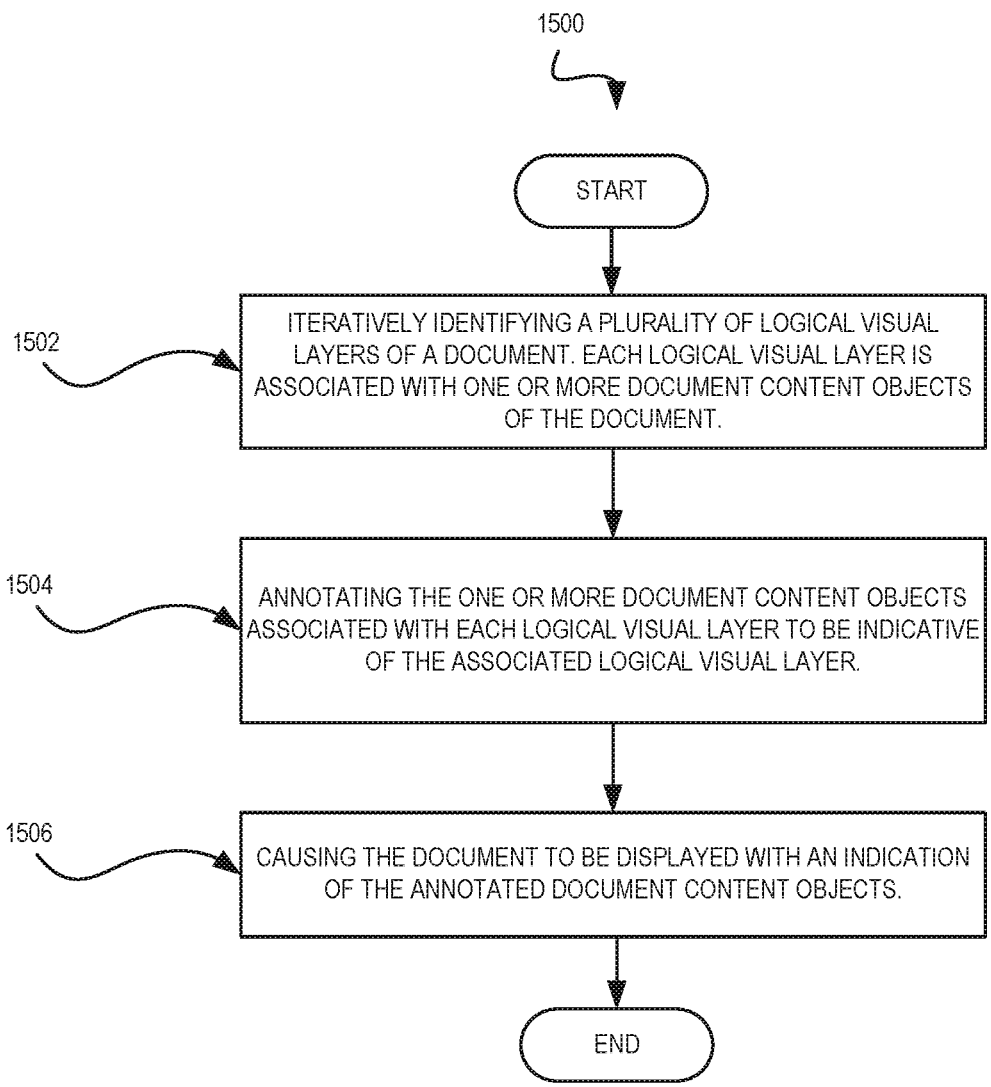
FIG. 15 illustrates a flowchart of a series of acts in a method for document decomposition based on determined logical visual layering of document content, according to an embodiment.

FIGS. 1-14, the corresponding text, and the examples, provide a number of different systems and devices for entity extraction. In addition to the foregoing, embodiments can also be described in terms of flowcharts comprising acts and steps in a method for accomplishing a particular result. For example, FIG. 15 illustrates a flowchart of an exemplary method in accordance with one or more embodiments. The method described in relation to FIG. 15 may be performed with fewer or more steps/acts or the steps/acts may be performed in differing orders. Additionally, the steps/acts described herein may be repeated or performed in parallel with one another or in parallel with different instances of the same or similar steps/acts.

Example Method

FIG. 15 illustrates a flowchart 1500 of a series of acts in a method of document decomposition based on determined visual hierarchy of document content, in accordance with one or more embodiments. In one or more embodiments, the method is performed in a digital medium environment that includes the few-shot entity extraction system 1400. The method is intended to be illustrative of one or more methods in accordance with the present disclosure and is not intended to limit potential embodiments. Alternative embodiments can include additional, fewer, or different steps than those articulated in FIG. 15.

As illustrated in FIG. 15, the method includes an act 1502 of iteratively identifying a plurality of logical visual layers of a target document to be decomposed. As a result, each logical visual layer identified is associated with one or more document content objects of the target document. The target document can be an entire document or a page, section, or portion of a document. The logical visual layers may be identified according to the iterative document decomposition process discussed herein with respect to FIG. 3. Specifically, the document is decomposed into the constituent document content objects over a plurality of iterations. Each iteration identifies one of the logical visual layers.

At each iteration, a current version of the target document is rendered as a document image and the foreground of the document image is separated from the document image. For the first iteration, the current version of the target document is the target document. For subsequent iterations, the current version of the target document is the version of the target document from the prior iteration with all document content objects determined in all previous iterations to be the foreground removed, disabled, skipped, or ignored for rendering purposes.

At each iteration, document content objects of the current version of the target document that are in the foreground are determined and those foreground document content objects are rendered as a foreground image. The document content objects of the current version of the target document that are in the foreground may be determined based on the rendering areas of the document content objects. In particular, document content objects having more than a threshold percentage or amount of their rendering area (e.g., greater than 50% of their area) within the foreground according to the foreground mask can be determined to be in the foreground of the current version of the target document. The foreground image may encompass a rendering of just the foreground document content objects of the current version of the target document determined to be in the foreground of the current version of the target document and not include a rendering of document content objects of the current version of the target document that are not determined to be in the foreground of the current version of the document.

Next, object detection or image segmentation is applied to the foreground image to detect or segment content elements in the foreground image. Document content objects of the current version of the target document that are in the foreground of the current version of the target document and that correspond to the detected or segmented content elements are selected to be associated with the current logical visual layer. This correspondence may be based on rendering area. In particular, the instructions or data of the target document for rendering content within the rendering area of a detected or segmented content element can be selected as a document content object in the current logical visual layer. Alternatively, a foreground document content object rendered in the foreground image can be selected as a document content object in the current logical visual layer if at least a threshold percentage (e.g., 75%) or amount of the rendering area of the foreground document content object is covered by the rendering area of the content element. Or a foreground document content object rendered in the foreground image can be selected as a document content object in the current logical visual layer if the rendering area of the foreground document content object covers at least a threshold percentage (e.g., 75%) or amount of the rendering area of the content element.

At the end of each iteration, a decision is made whether to perform more iterations. If so, before proceeding with the next iteration, a new version of the target document may be generated based on removing or disabling or tagging the document content objects selected for inclusion in the current logical visual layer so that the document content objects in the current logical visual layer are not rendered in the document image in the next iteration. The new version of the target document then becomes the current version of the target document for the next iteration. On the other hand, if no further iterations are to be performed, then all document content objects across all iterations that are selected for inclusion in a determined logical visual layer are combined in a final result.

The method also includes the act 1504 of annotating the document content objects selected for inclusion in each logical visual layer of the logical visual layers determined by the iterative decomposition process. This annotation may include storing annotation metadata in the target document or associated with the target document that identifies the rendering instructions or data in the target document of each document content object. The annotation metadata for a document content object can also identify the logical visual layer that the document content object is associated with such as by a z-order ordinal or other logical visual layer identifying tag or data.

The method also includes the act 1506 of causing the target document to be displayed with an indication of the annotated document content objects. The indication can be a bounding box or shape drawn around each document content object. The indication for a document content object may also include an identifier of the type of document content object (e.g., text, image, vector graphics, video, audio, link, etc.). The indication for a document content object may also indicate the logical visual layer that the document content object is associated with such as by a z-order identifier or by coloring of the bounding box or by other visual indication of the logical visual layer.

Example Processing Device

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more processing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other non-transitory medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network processing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be in both local and remote memory storage devices.

Embodiments of the present disclosure can also be implemented in cloud processing environments. In this description, "cloud processing" is defined as a model for enabling on-demand network access to a shared pool of configurable processing resources. For example, cloud processing can be employed in the marketplace to offer ubiquitous and convenient on-demand access to the shared pool of configurable processing resources. The shared pool of configurable processing resources can be rapidly provisioned via virtualization and released with low management effort or service provider interaction, and then scaled accordingly.

A cloud-processing model can be composed of various characteristics such as, for example, on-demand self-service, broad network access, resource pooling, rapid elasticity, measured service, and so forth. A cloud-processing model can also expose various service models, such as, for example, Software as a Service ("SaaS"), Platform as a Service ("PaaS"), and Infrastructure as a Service ("IaaS"). A cloud-processing model can also be deployed using different deployment models such as private cloud, community cloud, public cloud, hybrid cloud, and so forth. In this description and in the claims, a "cloud-processing environment" is an environment in which cloud processing is employed.

Figure 16:
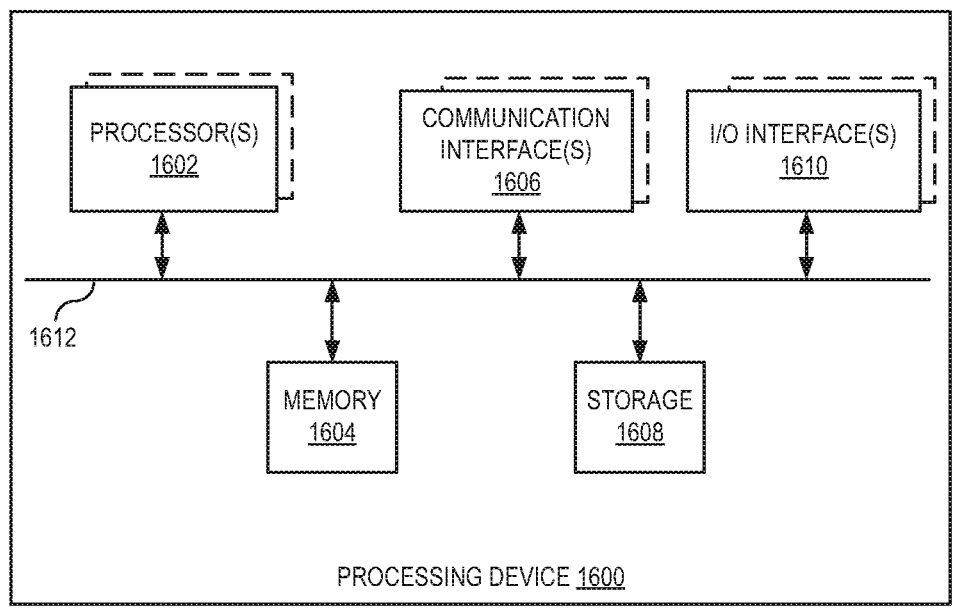
FIG. 16 illustrates a block diagram of an exemplary processing device, according to an embodiment.

FIG. 16 illustrates, in block diagram form, an exemplary processing device 1600 that may be configured to perform one or more of the processes described above. One will appreciate that one or more processing devices such as the processing device 1600 may implement document decomposition system 1400. As shown by FIG. 16, the processing device can comprise a processor 1602, memory 1604, one or more communication interfaces 1606, a storage device 1608, and one or more I/O devices/interfaces 1610. In certain embodiments, the processing device 1600 can include fewer or more components than those shown in FIG. 16. Components of processing device 1600 shown in FIG. 16 will now be described in additional detail.

In some embodiments, processor(s) 1602 includes hardware for executing instructions, such as those making up a computer program. As an example, and not by way of limitation, to execute instructions, processor(s) 1602 may retrieve (or fetch) the instructions from an internal register, an internal cache, memory 1604, or a storage device 1608 and decode and execute them. In various embodiments, the processor(s) 1602 may include one or more central processing units (CPUs), graphics processing units (GPUs), field programmable gate arrays (FPGAs), systems on chip (SoC), or other processor(s) or combinations of processors.

The processing device 1600 includes memory 1604, which is coupled to the processor(s) 1602. The memory 1604 may be used for storing data, metadata, and programs for execution by the processor(s). The memory 1604 may include one or more volatile and non-volatile memories, such as Random Access Memory ("RAM"), Read Only Memory ("ROM"), a solid-state disk ("SSD"), Flash, Phase Change Memory ("PCM"), or other types of data storage. The memory 1604 may be internal or distributed memory.

The processing device 1600 can further include one or more communication interfaces 1606. A communication interface 1606 can include hardware, software, or both. The communication interface 1606 can provide one or more interfaces for communication (such as, for example, packet-based communication) between the processing device and one or more other processing devices 1600 or one or more networks. As an example, and not by way of limitation, communication interface 1606 may include a network interface controller (NIC) or network adapter for communicating with an Ethernet or other wire-based network or a wireless NIC (WNIC) or wireless adapter for communicating with a wireless network, such as a WI-FI. The processing device 1600 can further include a bus 1612. The bus 1612 can comprise hardware, software, or both that couples components of processing device 1600 to each other.

The processing device 1600 includes a storage device 1608 includes storage for storing data or instructions. As an example, and not by way of limitation, storage device 1608 can comprise a non-transitory storage medium described above. The storage device 1608 may include a hard disk drive (HDD), flash memory, a Universal Serial Bus (USB) drive or a combination of these or other storage devices. The processing device 1600 also includes one or more input or output ("I/O") devices/interfaces 1610, which are provided to allow a user to provide input to (such as user strokes), receive output from, and otherwise transfer data to and from the processing device 1600. These I/O devices/interfaces 1610 may include a mouse, keypad or a keyboard, a touch screen, camera, optical scanner, network interface, modem, other known I/O devices or a combination of such I/O devices/interfaces 1610. The touch screen may be activated with a stylus or a finger.

The I/O devices/interfaces 1610 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 1610 are configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A method comprising:
   iteratively identifying one or more document content objects of an electronic document using a visual foreground of the electronic document, wherein the visual foreground of the electronic document is based on a logical visual layer of a plurality of logical visual layers of an electronic document;
   annotating the one or more document content objects associated with each logical visual layer of the plurality of logical visual layers to be indicative of the associated logical visual layer, wherein annotations for the one or more document content objects are stored as annotation metadata associated with the electronic document; and
   causing the electronic document to be displayed with a visual indication of one or more of the annotated document content objects.

2. The method of claim 1, further comprising:
   during a first iteration of a plurality of iterations:
      rendering the electronic document as a first document image,
      determining a foreground of the electronic document using the first document image,
      rendering a first document content object in a first foreground image,
      determining a first rendering area of the first foreground image, and
      determining that the first document content object corresponds to the first rendering area; and
   during a second iteration of the plurality of iterations:
      rendering a version of the electronic document without the first document content object as a second document image,
      determining a foreground of the version of the electronic document without the first document content object using the second document image,
      rendering a second document content object in a second foreground image,
      determining a second rendering area of the second foreground image, and
      determining that the second document content object corresponds to the second rendering area.

3. The method of claim 1, wherein a document content object associated with a first logical visual layer of the plurality of logical visual layers partially overlaps a second document content object associated with a second logical visual layer of the plurality of logical visual layers.

4. The method of claim 1, wherein a document content object of the electronic document comprises text or a raster image; and wherein the method further comprises: determining, during a first iteration of a plurality of iterations, that the document content object is in a foreground of the electronic document based on:
   determining a rendering area of the document content object; and
   determining how much of the rendering area is within a foreground mask.

5. The method of claim 1, wherein a document content object of the electronic document comprises a plurality of vector objects; and wherein the method further comprises: determining, during a first iteration of a plurality of iterations, that the document content object is in a foreground of the electronic document based on determining how much of each vector object of the plurality of vector objects is within a foreground mask.

6. The method of claim 1, wherein:
   determining, during a first iteration of a plurality of iterations, that a document content object of the electronic document is in a foreground of the electronic document based on using a machine learning model to separate an image of the electronic document into the foreground.

7. The method of claim 1, further comprising:
   receiving a user selection of a document content object of the electronic document;
   determining instructions or data of the electronic document for rendering the document content object;
   receiving a user edit to the document content object; and
   applying the user edit to the instructions or data of the electronic document for rendering the document content object.

8. The method of claim 1, wherein a document content object of the electronic document comprises instructions or data for rendering text, a raster image, a vector graphics image, audio, video, or a link.

9. A non-transitory computer-readable medium storing executable instructions which, when executed by a processing device, cause the processing device to perform operations comprising:
   receiving a first user input requesting to decompose an electronic document into constituent document content objects;
   iteratively decomposing the electronic document into a set of document content objects using a visual foreground of the electronic document, wherein the visual foreground of the electronic document is based on a plurality of logical visual layers of the electronic document;
   storing the set of document content objects as annotation metadata associated with the electronic document;
   receiving a second user input selecting a particular document content object of the set of document content objects;

receiving a third user input requesting to perform an action on the particular document content object; and performing the action on the particular document content object.

10. The non-transitory computer-readable medium of claim 9, wherein the electronic document is iteratively decomposed into the set of document content objects based on:

during a first iteration of a plurality of iterations:
rendering the electronic document as a first document image,
determining a foreground of the electronic document using the first document image,
rendering a first document content object in a first foreground image,
determining a first rendering area of the first foreground image, and
determining that the first document content object corresponds to the first rendering area; and during a second iteration of the plurality of iterations:
rendering a version of the electronic document without the first document content object as a second document image,
determining, using the second document image, a foreground of the version of the electronic document without the first document content object,
rendering a second document content object in a second foreground image,
determining a second rendering area of the second foreground image, and
determining that the second document content object corresponds to the second rendering area.

11. The non-transitory computer-readable medium of claim 9, wherein a first document content object of the set of document content objects partially overlaps a second document content object of the set of document content objects in the plurality of logical visual layers of the electronic document.

12. The non-transitory computer-readable medium of claim 9, wherein a document content object of the electronic document comprises text or a raster image; and wherein the electronic document is decomposed into the set of document content objects based on determining, during a first iteration of a plurality of iterations, the document content object is in a foreground of the electronic document based on determining a rendering area of the document content object, and determining how much of the rendering area is within a foreground mask.

13. The non-transitory computer-readable medium of claim 9, wherein a document content object comprises a plurality of vector objects; and wherein the electronic document is decomposed into the set of document content objects based on determining, during an iteration of a plurality of iterations, a document content object is in a foreground of the electronic document based on determining how much of each vector object of the plurality of vector objects is within a foreground mask.

14. The non-transitory computer-readable medium of claim 9, wherein iteratively decomposing the electronic document into a set of document content objects based on a plurality of logical visual layers of the electronic document further comprises:

iteratively identifying a plurality of logical visual layers of the electronic document, wherein each logical visual layer is associated with one or more document content objects of the set of document content objects; and annotating the one or more document content objects associated with each logical visual layer of the plurality of logical visual layers to be indicative of the associated logical visual layer.

15. A system comprising:
one or more memory components; and
one or more processing devices coupled to the one or more memory components, the one or more processing devices to perform operations comprising:
iteratively identifying one or more document content objects of an electronic document using a visual foreground of the electronic document, wherein the visual foreground of the electronic document is based on a logical visual layer of a plurality of logical visual layers of an electronic document;
annotating the one or more document content objects associated with each logical visual layer of the plurality of logical visual layers to be indicative of the associated logical visual layer, wherein annotations for the one or more document content objects are stored as annotation metadata associated with the electronic document; and
causing the electronic document to be displayed with a visual indication of one or more of the annotated document content objects.

16. The system of claim 15, the one or more processing devices to further perform operations comprising:

during a first iteration of a plurality of iterations:
rendering the electronic document as a first document image,
determining a foreground of the electronic document using the first document image,
rendering a first document content object in a first foreground image,
determining a first rendering area of the first foreground image, and
determining that the first document content object corresponds to the first rendering area; and during a second iteration of the plurality of iterations:
rendering a version of the electronic document as a second document image, wherein the second document image does not include a rendering of the first document content object,
determining a foreground of the version of the electronic document using the second document image,
rendering a second document content object in a second foreground image,
determining a second rendering area of the second foreground image, and
determining that the second document content object corresponds to the second rendering area.

17. The system of claim 15, wherein a first document content object partially overlaps a second document content object in a visual layering of the electronic document.

18. The system of claim 15, wherein a document content object comprises text or a raster image; and wherein the one or more processing devices are to perform determining, during an iteration of a plurality of iterations, that the document content object is in a foreground of the electronic document based on:

determining a rendering area of the document content object; and
determining how much of the rendering area is within a foreground mask.

19. The system of claim 15, wherein a document content object comprises a plurality of vector objects; and wherein the one or more processing devices are to perform determining, during an iteration of a plurality of iterations, that the document content object is in a foreground of the electronic document based on determining how much of each vector object of the plurality of vector objects is within a foreground mask.

20. The system of claim 15, wherein the one or more processing devices are to perform determining, during an iteration of a plurality of iterations, that a document content object is in a foreground of the electronic document based on using a machine learning model to separate an image of the electronic document into the foreground.

* * * * *